(12) United States Patent
Araragi

(10) Patent No.: US 10,831,225 B2
(45) Date of Patent: Nov. 10, 2020

(54) DRIVE CIRCUIT FOR SWITCH

(71) Applicant: DENSO CORPORATION, Kariya (JP)

(72) Inventor: Akifumi Araragi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/372,481

(22) Filed: Apr. 2, 2019

(65) Prior Publication Data

US 2019/0310675 A1 Oct. 10, 2019

(30) Foreign Application Priority Data

Apr. 5, 2018 (JP) ................. 2018-073142

(51) Int. Cl.
*G05F 3/08* (2006.01)
*H02M 7/5387* (2007.01)
*H02M 1/08* (2006.01)
*G05F 1/46* (2006.01)

(52) U.S. Cl.
CPC ............. *G05F 3/08* (2013.01); *G05F 1/461* (2013.01); *H02M 1/08* (2013.01); *H02M 7/5387* (2013.01)

(58) Field of Classification Search
CPC ................. G05F 3/00; G05F 3/02; G05F 3/08
See application file for complete search history.

(56) References Cited

U.S. PATENT DOCUMENTS 10,291,110 B2 * 5/2019 Watanabe ............. H02M 1/088

FOREIGN PATENT DOCUMENTS

JP 2013-034382 A 2/2013

* cited by examiner

*Primary Examiner* — Hai L Nguyen
(74) *Attorney, Agent, or Firm* — Oliff PLC

(57) ABSTRACT

In a drive circuit, a reference voltage generator generates a reference voltage that monotonically increases in a direction to pass through the threshold voltage during a voltage at the control terminal being lower than the Miller voltage. A buffer unit supplies the reference voltage output from the reference voltage generator to the control terminal of the switch, and adjusts a first transfer rate of electrical charge to or from the control terminal of the switch during at least part of a Miller period to be higher than a second transfer rate of electrical charge to or from the control terminal of the switch during the voltage at the control terminal of the switch passing through the threshold voltage. The Miller period is a period during which the voltage at the control terminal of the switch is maintained at the Miller voltage.

13 Claims, 14 Drawing Sheets

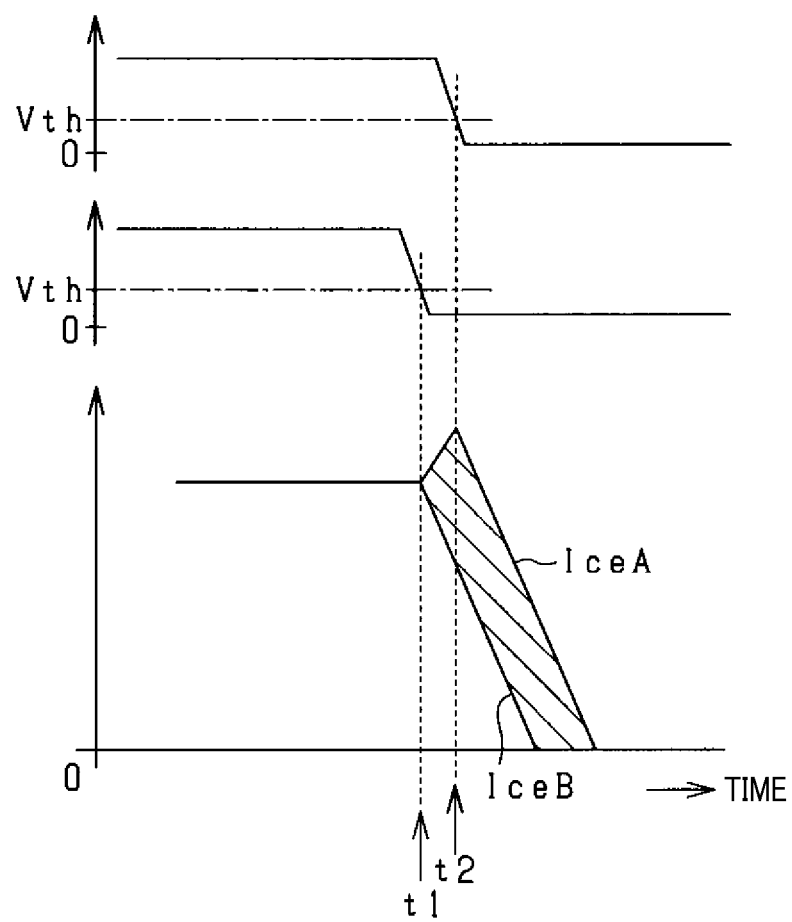

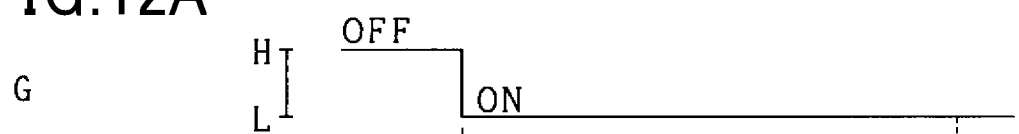
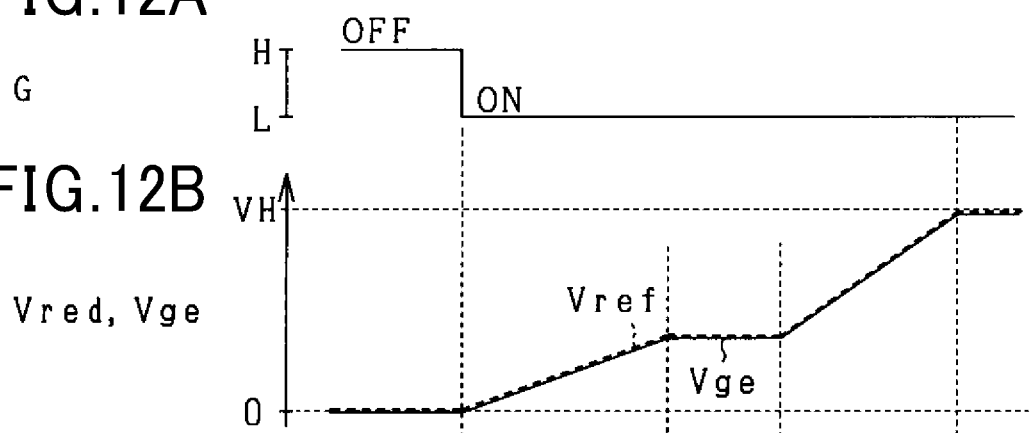
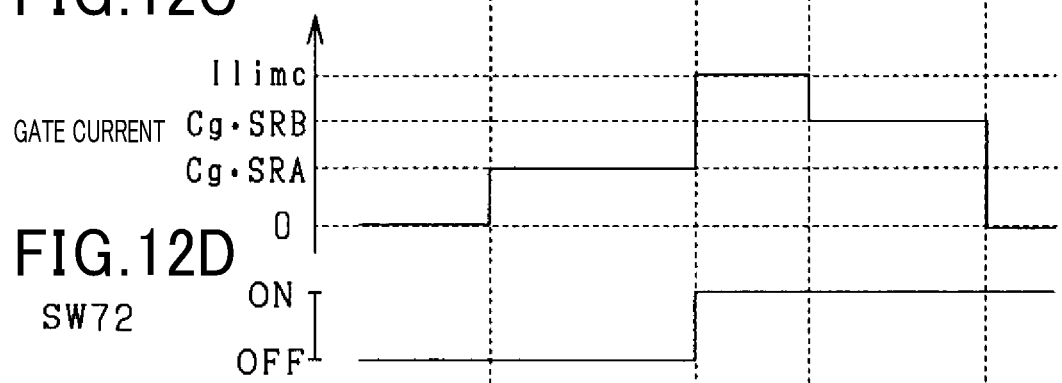
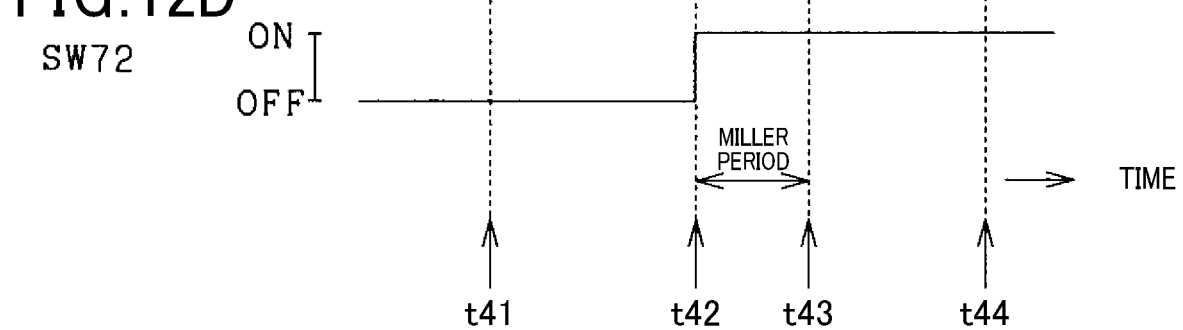

DRIVE CIRCUIT FOR SWITCH

CROSS REFERENCE TO RELATED APPLICATION

This application is based on and claims the benefit of priority from Japanese Patent Application No. 2018-73142 filed on Apr. 5, 2018, the disclosure of which is incorporated in their entireties herein by reference.

TECHNICAL FIELD

The present disclosure relates to drive circuits for a switch.

BACKGROUND

Switches, such as mass-produced switches, have variations in their switching characteristics due to their individual differences.

SUMMARY

There is provided a drive circuit for driving a switch having a control terminal, a Miller voltage, and a threshold voltage lower than the Miller voltage according to an aspect of the present disclosure. The drive circuit includes a buffer unit. The buffer unit is configured to supply a reference voltage to the control terminal of the switch, and adjust a first transfer rate of electrical charge to or from the control terminal of the switch during at least part of a Miller period to be higher than a second transfer rate of electrical charge to or from the control terminal of the switch during the voltage at the control terminal of the switch passing through a threshold voltage. The Miller period is a period during which the voltage at the control terminal of the switch is maintained at the Miller voltage.

BRIEF DESCRIPTION OF THE DRAWINGS

Other aspects of the present disclosure will become apparent from the following description of embodiments with reference to the accompanying drawings in which:

FIGS. 3A to 3C are a joint timing chart schematically illustrating an imbalance phenomenon;

FIGS. 12A to 12D are a joint timing chart schematically illustrating how a reference voltage generator and a voltage buffer illustrated in FIG. 11 work;

DETAILED DESCRIPTION OF EMBODIMENT INVENTOR'S VIEWPOINT

Figure 1:
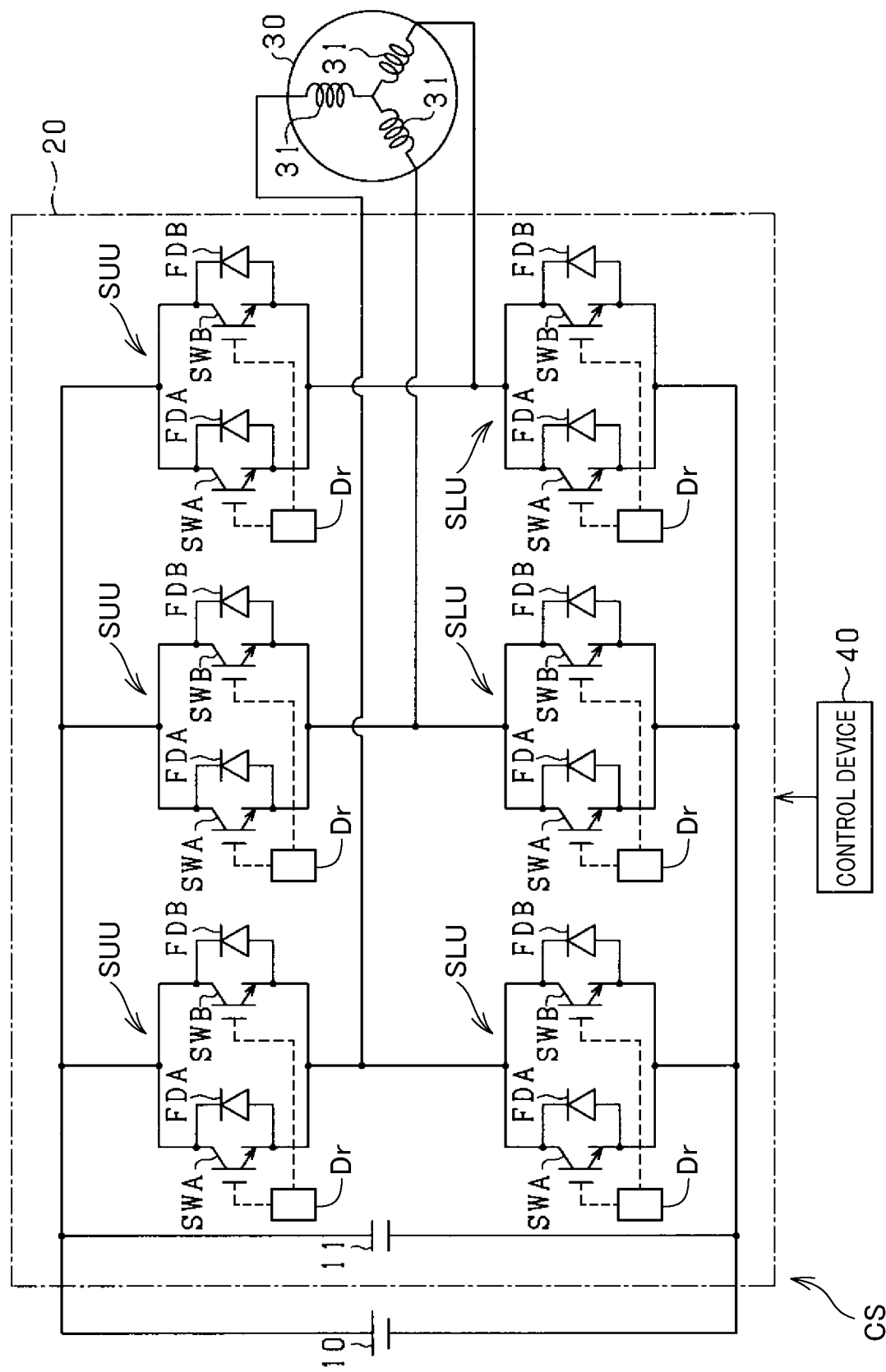
FIG. 1 is a circuit diagram schematically illustrating an example of the overall structure of a control system for a rotary electric machine according to the first embodiment of the present disclosure.

Switches, such as mass-produced switches, have variations in their switching characteristics due to their individual differences.

The switching characteristics of a switch include, for example, the threshold voltage, the Miller voltage, and the amount of charge required to charge its control terminal for turning on of the switch, such as the gate, if the switch is a MOSFET or an IGBT. The variations in the switching characteristics of the switches vary their switching rates.

Japanese Patent Application Publication No. 2013-34382 discloses a technology that charges the gate of an IGBT using a constant current.

An increase in a duration during which the voltage at the control terminal of a switch is maintained at the Miller voltage may increase loss resulting from switching of the switch from one of an on state and an off state to the other.

From this viewpoint, one aspect of the present disclosure seeks to provide drive circuits for a switch, each of which is capable of reducing loss resulting from switching of the switch from one of the on state and the of state to the other.

According to an exemplary aspect of the present disclosure, there is provided a drive circuit for driving a switch having a control terminal, a Miller voltage, and a threshold voltage lower than the Miller voltage. The drive circuit includes a reference voltage generator configured to generate a reference voltage that monotonically increases in a direction to pass through the threshold voltage during a voltage at the control terminal being lower than the Miller voltage, and includes a buffer unit.

The buffer unit is configured to supply the reference voltage output from the reference voltage generator to the control terminal of the switch, and adjust a first transfer rate of electrical charge to or from the control terminal of the switch during at least part of a Miller period to be higher than a second transfer rate of electrical charge to or from the control terminal of the switch during the voltage at the control terminal of the switch passing through the threshold voltage. The Miller period is a period during which the voltage at the control terminal of the switch is maintained at the Miller voltage.

Reducing loss generated due to switching of a switch from one of the on state and the off state to the other thereof may require an increase of a transfer rate of electrical charge to or from the control terminal of the switch, and a reduction in the Miller period. As to the requirement, an increase in the transfer rate during a period for which the voltage at the control terminal has passed through the threshold voltage may increase a changing rate of a current flowing through the switch, resulting in an increase in a surge voltage. For example, an excessive increase in the charging speed of the control terminal of the switch during the Miller period may cause the increase rate of the current flowing through the switch to rapidly increase.

From this viewpoint, the reference voltage generator is configured to generate the reference voltage that monotonically increases in the direction to pass through the threshold voltage during the voltage at the control terminal being lower than the Miller voltage. Then, the buffer unit supplies the reference voltage output from the reference voltage generator to the control terminal of the switch. Adjusting the changing speed of the reference voltage output from the reference voltage generator enables the change speed of the current, which flows though the switch during the switch being switched from one of the on state and the off state to the other thereof, to be set to a value suitable for suppressing a surge voltage.

The buffer also adjusts the first transfer rate of electrical charge to or from the control terminal of the switch during at least part of the Miller period to be higher than the second transfer rate of electrical charge to or from the control terminal of the switch during the voltage at the control terminal of the switch passing through the threshold voltage. The Miller period is a period during which the voltage at the control terminal of the switch is maintained at the Miller voltage. This enables the charging or discharging current for the control terminal of the switch during the at least part of the Miller period to increase, thus shortening a length of the Miller period.

This therefore makes shorter the Miller period of the switch while suppressing an increase of a surge voltage generated when the switch is switched from one of the on state and off state to the other thereof.

Embodiment

The following describes embodiments of the present disclosure with reference to the accompanying drawings. In the embodiments, like parts between the embodiments, to which like reference characters are assigned, are omitted or simplified to avoid redundant description.

First Embodiment

The following describes the first embodiment of the present disclosure with reference to FIGS. 1 to 4. The first embodiment shows, for example, drive circuits Dr as components of a control system CS for a rotary electric machine 30.

Referring to FIG. 1, the control system CS includes a battery 10 serving as a direct-current (DC) power source, an inverter 20 serving as a power converter, the rotary electric machine 30, and a control device 40.

The rotary electric machine 30 is electrically connected to the battery 10 via the inverter 20. The first embodiment uses a permanent magnet synchronous three-phase rotary electric machine as the rotary electric machine 30. In particular, the rotary electric machine 30 includes a rotor having permanent magnets, and a stator having a stator core and three-phase stator coils 31. In particular, the rotary electric machine 30 is capable of rotating the rotor having the permanent magnets based on magnetic interactions between the permanent magnets of the rotor and a rotating magnetic field generated by the three-phase stator coils 31 of the stator. Each of the three-phase stator coils 31 has opposing first and second ends. The stator can be configured such that each of the three-phase stator coils 31 is wound in and around the stator core in concentrated or distributed configuration.

The control system CS also includes a smoothing capacitor 11, which is comprised of first and second electrodes located to face each other, connected in parallel to the battery 10 and located between the battery 10 and the inverter 20.

The inverter 20 includes three (UVW)-phase upper- and lower-arm switch units SUU and SLU. The upper-arm switch unit SUU for each phase is comprised of a first switch SWA and a second switch SWB connected in parallel to each other, and similarly the lower-arm switch unit SLU is comprised of a first switch SWA and a second switch SWB connected in parallel to each other.

Each of the first and second switches SWA and SWB of the upper-arm switch unit SUU for each phase has high- and low-side terminals, and each of the first and second switches SWA and SWB of the lower-arm switch unit SLU for each phase also has high- and low-side terminals.

The high-side terminals of the first and second switches SWA and SWB of the upper-arm switch unit SUU for each phase provide a common high-side terminal, and the common high-side terminal of the upper-arm switch units SUU is connected to the first electrode of the smoothing capacitor 11.

The high-side terminals of the first and second switches SWA and SWB of the lower-arm switch unit SLU for each phase also provide a common low-side terminal.

The low-side terminals of the first and second switches SWA and SWB of the upper-arm switch unit SUU for each phase provide a common low-side terminal, and the common low-side terminal of the upper-arm switch units SUU is connected to the common high-side terminal of the lower-arm switch units SLU.

The low-side terminals of the first and second switches SWA and SWB of the lower-arm switch unit SLU for each phase provide a common low-side terminal, and the common low-side terminal of the lower-arm switch units SLU is connected to the second electrode of the smoothing capacitor 11.

The connection point between the upper- and lower-arm switch units SUU and SLU for the U-phase is connected to the first end of the U-phase stator coil 31. Similarly, the connection point between the upper- and lower-arm switch units SUU and SLU for the V-phase is connected to the first end of the V-phase stator coil 31, and the connection point between the upper- and lower-arm switch units SUU and SLU for the W-phase is connected to the first end of the W-phase stator coil 31. The second ends of the U-, V-, and W-phase coils 31 are connected to a common junction, i.e. a neutral point, in, for example, a star-configuration.

The first embodiment uses voltage-controlled semiconductor switches, more specifically uses Si IGBTs, for the respective switches SWA and SWB. That is, the high-side terminal of each of the first and second switches SWA and SWB is the collector, and the low-side terminal of each of the first and second switches SWA and SWB is the emitter. Each upper-arm switch unit includes first and second flyback, i.e. free-wheeling, diodes FDA and FDB connected in antiparallel to the respective first and second switches SWA and SWB. Similarly, each lower-arm switch unit includes first and second flyback, i.e. free-wheeling, diodes FDA and FDB connected in antiparallel to the respective first and second switches SWA and SWB.

The inverter 20 also includes the drive circuits Dr provided for the respective switch units SUU and SLU. Each drive circuit Dr is operative to turn on or off the corresponding switches SWA and SWB of the corresponding switch unit under control of the control device 40.

The control device 40 causes each drive circuit Dr to alternately turn on (1) The set of the first and second switches SWA and SWB of the upper-arm switch unit SUU of each phase (2) The set of the first and second switches SWA and SWB of the lower-arm switch unit SLU of the corresponding phase This switching operations of the switches SWA and SWB cause a controlled variable, such as torque, of the rotary electric machine 30 to match with a commanded value or a requested value.

Specifically, the control device 40 cyclically generates, as a drive signal G for each switch unit, an on command or an off command, and cyclically sends the on command or off command of the drive signal G to each drive circuit Dr of the corresponding switch unit; the on command has a logical high level (H), and instructs each drive circuit Dr to turn on the first and second switches SWA and SWB of the corresponding switch unit, and the off command has a logical low level (L), and instructs each drive circuit Dr to turn off the first and second switches SWA and SWB of the corresponding switch unit.

Each drive circuit Dr receives the corresponding drive signal G, and turns on or off the first and second switches SWA and SWB of the corresponding switch unit in accordance with the corresponding drive signal G. In particular, each drive circuit Dr according to the first embodiment synchronously turns on or off the first and second switches SWA and SWB of the corresponding switch unit in accordance with the corresponding drive signal G.

Figure 2:
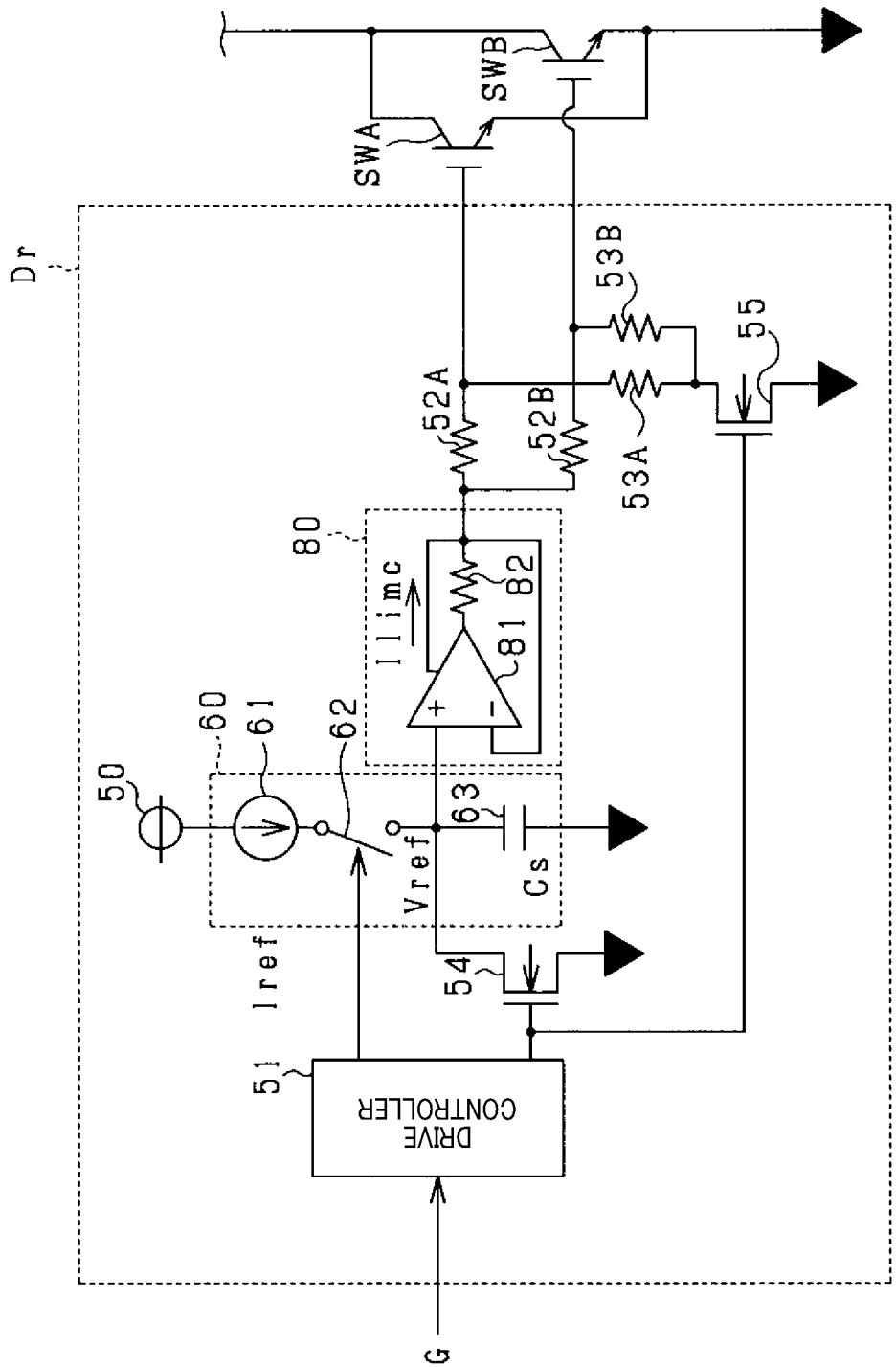
FIG. 2 is a circuit diagram schematically illustrating an example of the structure of a drive circuit for each switch unit illustrated in FIG. 1.

Next, the following describes an example of the structure of each drive circuit Dr for the corresponding switch unit with reference to FIG. 2. The drive circuits Dr for the respective switch units SUU and SLU basically have a common structure. For this reason, the following describes the structure of the drive circuit Dr for the U-phase upper-arm switch unit SUU as a typical example.

Referring to FIG. 2, the drive circuit Dr includes a constant voltage source 50, a drive controller 51, a reference voltage generator 60, and a voltage buffer 80. The drive circuit Dr also includes a first charge resistor 52A, a second charge resistor 52B, a first discharge resistor 53A, a second discharge resistor 53B, a first discharge switch 54, and a second discharge switch 55.

The first embodiment uses a MOSFET as each of the first and second discharge switches 54 and 55.

Each of the resistors 52A, 52B, 53A, and 53B has opposing first and second ends.

The reference voltage generator 60 includes a constant current source 61, a charge switch 62, and a capacitor 63. The capacitor 63 is comprised of first and second electrodes located to face each other, and has a capacitance Cs.

The constant current source 61 has an input terminal and an output terminal, and the input terminal of the constant current source 61 is connected to the constant voltage source 50. The output terminal of the constant current source 61 is connected to the first electrode of the capacitor 63 via the charge switch 62, and the second electrode of the capacitor 63 is connected to the emitter of each of the first and second switches SWA and SWB via a common signal ground. The charge switch 62 has a control terminal connected to the drive controller 51.

The constant current source 61 outputs a constant output current Iref based on a constant voltage VH output from the constant voltage source 50. That is, the constant voltage source 50 serves as a power source for the constant current source 61. This enables the capacitor 63 to be charged based on the constant output current Iref while the charge switch 52 is in the on state. Note that the potential at the first electrode of the capacitor 63 relative to the potential at the common signal ground is referred to as a reference voltage Vref. That is, the reference voltage generator 60 is configured to generate the reference voltage Vref across the capacitor 63.

The voltage buffer 80 has a voltage buffering function and a current limit function. Specifically, the voltage buffer 80 is operative to buffer the reference voltage Vref of the reference voltage generator 60 while limiting an output current thereof to a charge limit ILimc. For example, the voltage buffer 80 includes an operational amplifier 81 and a charge limit resistor 82. The operational amplifier 81 has a non-inverting input terminal, an inverting input terminal, and an output terminal, and the charge limit resistor 82 has opposing first and second ends. The non-inverting input terminal of the operational amplifier 81 is connected to the first electrode of the capacitor 63, and the output terminal of the operational amplifier 81 is connected to the first end of the charge limit resistor 82. The inverting input terminal of the operational amplifier 81 is connected to the second end of the charge limit resistor 82.

The drain of the first discharge switch 54 is connected to the first electrode of the capacitor 63, and the source of the first discharge switch 54 is connected to the common signal ground.

The first end of the first charge resistor 52A is connected to the second end of the charge limit resistor 82, and the second end of the first charge resistor 52A is connected to the gate of the first switch SWA. The first end of the first discharge resistor 53A is connected to the gate of the first switch SWA, and the second end of the first discharge resistor 53A is connected to the drain of the second discharge switch 55. The source of the second discharge switch 55 is connected to the common signal ground.

The first end of the second charge resistor 52B is connected to the second end of the charge limit resistor 82, and the second end of the second charge resistor 52B is connected to the gate of the second switch SWB. The first end of the second discharge resistor 53B is connected to the gate of the second switch SWB, and the second end of the second discharge resistor 53B is connected to the drain of the second discharge switch 55. The gate of each of the first and second discharge switches 54 and 55 is connected to the drive controller 51.

The drive controller 51 is configured to control on-off switching operations of each of the charge switch 62, the first discharge switch 54, and the second discharge switch 55 in accordance with the drive signal G sent from the control device 40. The drive controller 51 is comprised of, for example, a computer including a processor, such as a CPU, a memory, and a peripheral circuit. At least part of all functions provided by the drive controller 51 can be implemented by at least one processor; the at least one processor can be comprised of (1) The combination of at least one programmed processing unit, i.e. at least one programmed logic circuit, and at least one memory including software that causes the at least one programed logic circuit to implement all the functions (2) At least one hardwired logic circuit that implements all the functions (3) At least one hardwired-logic and programmed-logic hybrid circuit that implements all the functions The drive controller 51 determines whether the drive signal G sent from the control device 40 is the on command or off command.

When determining that the drive signal G sent from the control device 40 is the on command, the drive controller 51 performs a charging task to thereby turn on the charge switch 62 while turning off the first and second discharge switches 54 and 55.

This causes the reference voltage Vref, which is the potential at the first electrode of the capacitor 63 relative to the potential at the common signal ground, to increase from zero volts at a constant rate assuming that the potential at the common signal ground is set to 0 volts. The increase rate of the reference voltage Vref will be referred to as a charging slew rate SRC. That is, the charging slew rate SRC represents the amount of increase $\Delta V$ of the reference voltage Vref per unit time $\Delta T$, and is defined as a function of the constant output current Iref and the capacitance Cs of the capacitor 63, which is specifically expressed by the equation SRC=Iref/Cs.

The voltage buffer 80 buffers the reference voltage Vref, and supplies the reference voltage Vref to the gate of each of the first and second switches SWA and SWB.

This charging task causes a charging current based on the reference voltage Vref to output to the gate of each of the first and second switches SWA and SWB via the corresponding one of the first and second gate resistors 52A and 52B, resulting in a voltage at each of the first and second switches SWA and SWB, which is referred to as a gate voltage Vge, rising up to be equal to or higher than the threshold voltage Vth. This results in each of the first and second switches SWA and SWB being switched from the off state to the on state, enabling a current to flow from the collector to emitter of the corresponding one of the first and second switches SWA and SWB. Note that the threshold voltage Vth of each of the first and second switches SWA and SWB is set to be lower than the Miller voltage of the corresponding one of the first and second switches SWA and SWB.

Otherwise, when determining that the drive signal G sent from the control device 40 is the off command, the drive controller 51 performs a discharging task to thereby turn off the charge switch 62 while turning on each of the first and second discharge switches 54 and 55. This discharging task causes the gate of each of the first and second switches SWA and SWB to be connected to the common signal ground via the second discharge switch 55, causing a discharging current to flow from the gate of each of the first and second switches SWA and SWB to the common signal ground. This results in the gate voltage Vge of each of the first and second switches SWA and SWB falling down to be lower than the threshold voltage Vth. This results in each of the first and second switches SWA and SWB being switched from the on state to the off state. In addition, a discharging current flows from the first electrode of the capacitor 63 via the first discharge switch 54, resulting in the reference voltage Vref falling down to 0 volts.

Note that the charging current supplied to the control terminal of a switch, i.e. the gate of the switch SWA, SWB, represents, for example, a transfer rate or a moving speed of electrical charge supplied to the control terminal of a switch. Similarly, the discharging current dissipated, i.e. discharged, from the control terminal of a switch, i.e. the gate of the switch SWA, SWB, represents, for example, a transfer rate of electrical charge discharged from the control terminal of a switch.

In particular, the reference voltage generator 60 and the buffer 80 are provided to reduce a period of an imbalance phenomenon between the first and second switches SWA and SWB. The following describes the imbalance phenomenon between the first and second switches SWA and SWB generated when the first and second switches SWA and SWB are switched from the on state to the off state.

FIG. 3A schematically illustrates how the gate voltage Vge of the first switch SWA is changed over time, and FIG. 3B schematically illustrates how the gate voltage Vge of the second switch SWB is changed over time. FIG. 3C schematically illustrates how each of a collector current IceA flowing through the first switch SWA and a collector current IceB flowing through the second switch SWB is changed over time.

As described above, the drive controller 51 is configured to synchronously turn off the first and second switches SWA and SWB in response to change of the drive signal G from the on command to the off command. Unfortunately, there is a time lag between the actual turn-off timing of the first switch SWA and the actual turn-off timing of the second switch SWB. For example, FIG. 3A illustrates that the second switch SWB is turned off at time t1, and thereafter, the first switch SWA is turned off at time t2.

This causes the collector current IceA flowing through the first switch SWA to temporarily rise up to the time t2, and thereafter to fall down. In contrast, the collector current IceB flowing through the second switch SWB falls down from the time t1.

This results in the collector current IceA, which flows through the first switch SWA, and the collector current IceB, which flows through the second switch SWB, being greatly deviated from each other; this current deviation is called "an imbalance phenomenon" set forth above. This imbalance phenomenon increases switching loss of the first switch SWA. FIG. 3C schematically illustrates the deviation between the collector current IceA, which flows through the first switch SWA, and the collector current IceB, which flows through the second switch SWB, as a hatched region.

Similarly, there is a time lag between the actual turn-on timing of the first switch SWA and the actual turn-on timing of the second switch SWB. Specifically, assuming that one of the first and second switches SWA and SWB is turned on earlier than the other thereof, a collector current flowing through the earlier turn-on switch temporarily increases, and thereafter, falls down to zero.

For addressing such an imbalance phenomenon, the reference voltage generator 60 and the voltage buffer 80 are provided to reduce the period of the imbalance phenomenon generated when the first and second switches SWA and SWB are switched from the off state to the on state.

Figure 4A:
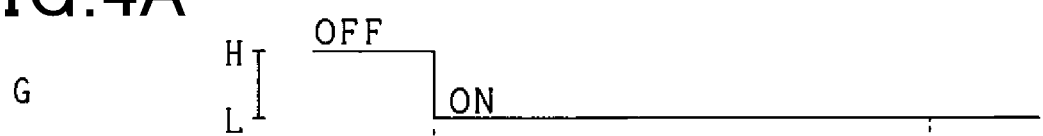
FIGS. 4A to 4C are a joint timing chart schematically illustrating how a reference voltage generator and a voltage buffer illustrated in FIG. 2 work.
Figure 4B:
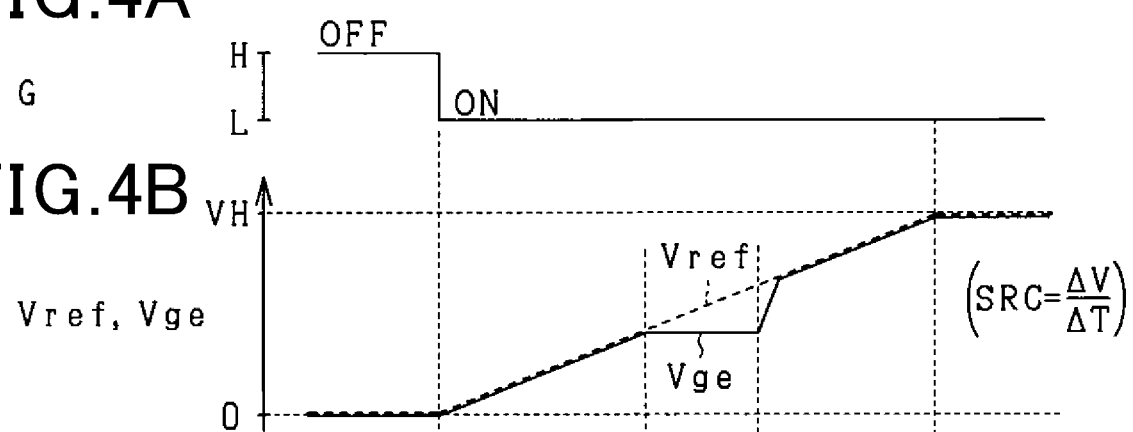
Figure 4C:
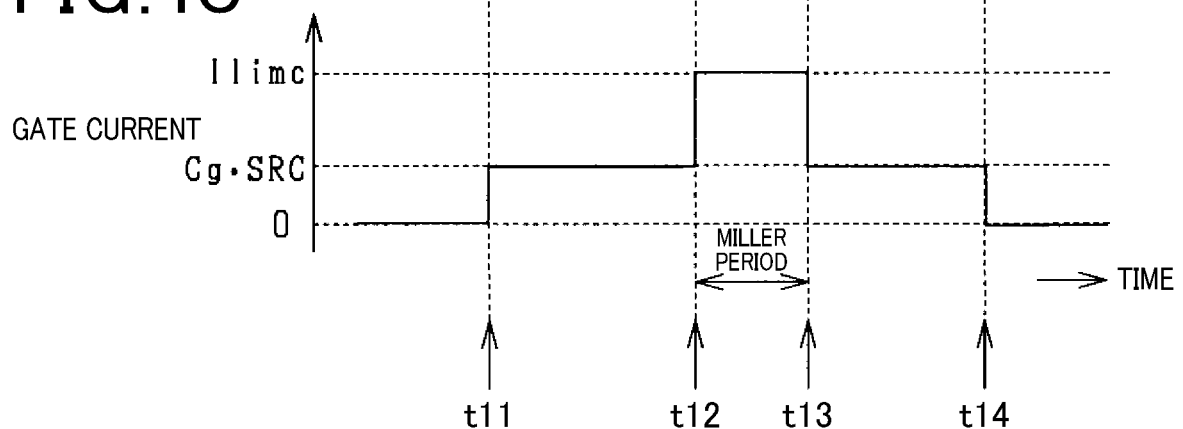

The following describes how the reference voltage generator 60 and the voltage buffer 80 work with reference to FIGS. 4A to 4C.

FIG. 4A schematically illustrates how the drive signal G is changed over time, and FIG. 4B schematically illustrates how the reference voltage Vref and the gate voltage Vge of each of the first and second switches SWA and SWB are changed over time. In addition, FIG. 4C schematically illustrates how the charging current supplied to the gate of each of the first and second switches SWA and SWB is changed over time.

Before time t11, the drive signal G being in the off command maintains each of the first and second discharge switches 54 and 55 in the on state. This dissipates charge stored in the capacitor 63, resulting in the reference voltage Vref being 0 volts.

Switching the drive signal G from the off command to the on command at the time t11 turns on the charge switch 62, and turns off the first and second discharge switches 54 and 55. This causes the reference voltage Vref to start to increase from 0 volts at the charging slew rate SRC.

During the time t11 to time t12, the voltage buffer 80 buffers the reference voltage Vref, and supplies the reference voltage Vref, which increases at the charging slew rate SRC, to the gate of each of the first and second switches SWA and SWB. This causes the gate voltage Vge of each of the first and second switches SWA and SWB, which will be referred to simply as a gate voltage Vge, to increase while following the reference voltage Vref up to the Miller voltage from the time t11 to time t12.

Because the gate voltage Vge has continuously followed the reference voltage Vref and increased at the constant charging slew rate SRC for the period from the time t11 to the time t12, the voltage difference between the reference voltage Vref and the gate voltage Vge is substantially zero, so that a gate-emitter capacitance Cg of each of the first and second switches SWA and SWB has been charged by the constant charging current, which is expressed by the product of the gate-emitter capacitance Cg and the charging slew rate SRC.

The charging slew rate SRC during the period from the time t11 to the time t12 for turning on each of the first and second switches SWA and SWB determines the rising rate of a collector current Ice of the corresponding one of the first and second switches SWA and SWB. For this reason, the charging slew rate SRC is set to a value suitable for maintaining a surge voltage due to the rising rate of the collector current Ice to be lower than a predetermined allowable voltage.

After the gate voltage Vge exceeds the threshold voltage Vth of each of the first and second switches SWA and SWB, the collector-emitter voltage, which will be referred to as a collector voltage Vce, of each of the first and second switches SWA and SWB starts to fall down.

When the gate voltage Vge has reached the Miller voltage, the gate voltage Vge becomes equal to the collector voltage Vce of each of the first and second switches SWA and SWB, so that a gate-collector capacitance, which will be referred to as a feedback capacitance, of each of the first and second switches SWA and SWB increases.

Therefore, because it is necessary to charge the feedback capacitance of each of the first and second switches SWA and SWB, the charge stored in the gate of each of the first and second switches SWA and SWB flows into the feedback capacitance, causing the gate voltage Vge not to increase. In contrast, the reference voltage Vref continuously increases. This difference between the reference voltage Vref and the gate voltage Vge results in the charging current output from the voltage buffer 80 increasing so as to reach the charging limit ILimc.

During the period from the time t12 to time 13, the gate voltage Vge is maintained at the Miller voltage. Because the input impedance of the voltage buffer 80, i.e. the input impedance of the operational amplifier 81, is maintained at a very high level during the Miller period for which the gate voltage Vge is maintained at the Miller voltage, the reference voltage Vref continuously increases at the charging slew rate during the Miller period.

During the Miller period, the charging current is limited to the charge limit ILimc. Note that the charge limit ILimc is previously set such that the decrease rate of the collector voltage Vce, which is expressed by dVce/dt, is prevented from excessively increasing.

When charging of the feedback capacitance is completed at the time t3, the Miller period is terminated. Thereafter, the gate voltage Vge follows the reference voltage Vref, which continuously increases at the charging slew rate SRC, again. Thereafter, the gate voltage Vge reaches an upper limit corresponding to the constant voltage VH output from the constant voltage source 50.

Note that a period during which the gate voltage Vge is located outside the Miller period will be referred to as an extra-Miller period.

The drive circuit Dr according to the first embodiment set forth above obtains the following technical benefits.

Usually, shortening the period of the imbalance phenomenon generated when the first and second switches SWA and SWB are turned on requires an increase of a charging current to be supplied to the gate of each switch SWA, SWB, and a reduction in the Miller period. As to the requirement, an increase in the charging current during the period for which the gate voltage has increased to reach the Miller voltage would increase the increase rate of the collector current flowing through each of the first and second switches SWA and SWB, resulting in an increase in a surge voltage due to the increasing of the collector current.

Additionally, an excessive increase in the charging current during the Miller period would cause the collector voltage of each of the first and second switches SWA and SWB to rapidly decrease.

From the above viewpoints, the reference voltage generator 60 is configured to generate the reference voltage Vref that gradually increases at the charging slew rate SRC during the period, which will be referred to as a pre-Miller period, until which the gate voltage Vge increases from the time of the drive signal G being switched to the on command to the time of reaching the Miller voltage while passing through the threshold voltage Vth.

The voltage buffer 80 supplies the reference voltage Vref generated by the reference voltage generator 60 to the gate of each of the first and second switches SWA and SWB, thus charging the gate of each of the first and second switches SWA and SWB using a first charging current during the pre-Miller period. This results in the gate voltage Vge of each of the first and second switches SWA and SWB increasing while passing through the threshold voltage Vth.

Adjusting the increase rate of the reference voltage Vref using the charging slew rate SRC enables the increase rate of the collector current during the switches SWA and SWB being switched from the off state to the on state to be set to a value suitable for suppressing a surge voltage.

Additionally, the voltage buffer 80 charges the gate of each of the first and second switches SWA and SWB using a second charging current during the Miller period while adjusting the second charging current being higher than the first charging current and equal to or lower than the charge limit ILimc. This configuration results in the second charging current being higher than the first charging current while maintaining the second charging current to be equal to or lower than the charge limit ILimc during the Miller period, making it possible to shorten the Miller period. The voltage buffer 80 is also configured to set the charge limit ILimc to a value suitable for limiting an increase in the decrease rate of the collector voltage Vce of each off the first and second switches SWA and SWB.

Consequently, the drive circuit Dr of the first embodiment reduces the Miller period while limiting an increase in each of (1) The increase rate of the collector current flowing through each of the first and second switches SWA and SWB during the period of the corresponding one of the switches SWA and SWB being switched from the off state to the on state (2) The decrease rate of the collector voltage Vce of each of the first and second switches SWA and SWB during the period of the corresponding one of the first and second switches SWA and SWB being switched from the off state to the on state This therefore results in a shorter length of the Miller period, therefore resulting in a shorter length of the period of the imbalance phenomenon.

The reference voltage generator 60 gradually increases the reference voltage Vref at the charge slew rate SRC during the Miller period. Because the gate voltage Vge of each of the first and second switches SWA and SWB is maintained at the Miller voltage during the Miller period, the reference voltage Vref to be supplied to the gate of each of the first and second switches SWA and SWB becomes gradually larger than the Miller voltage. This maker larger the gate voltage Vge, i.e. the charging voltage, supplied to the gate of each of the first and second switches SWA and SWB, resulting in a shorter length of the Miller period.

Modifications of the First Embodiment

The reference voltage generator 60 can be configured to stepwisely increase the reference voltage Vref after the gate voltage Vge has reached a predetermined voltage that is higher than the Miller voltage and lower than the constant voltage VH output from the constant voltage source 50. This configuration makes faster the switching rate, i.e. the turn-on rate, of each of the first and second switches SWA and SWB, thus reducing switching loss of each of the first and second switches SWA and SWB.

The voltage buffer 80 can be configured to adjust the second charging current during a part of the Miller period to be larger than the first charging current used during the pre-Miller period.

Second Embodiment

Figure 5:
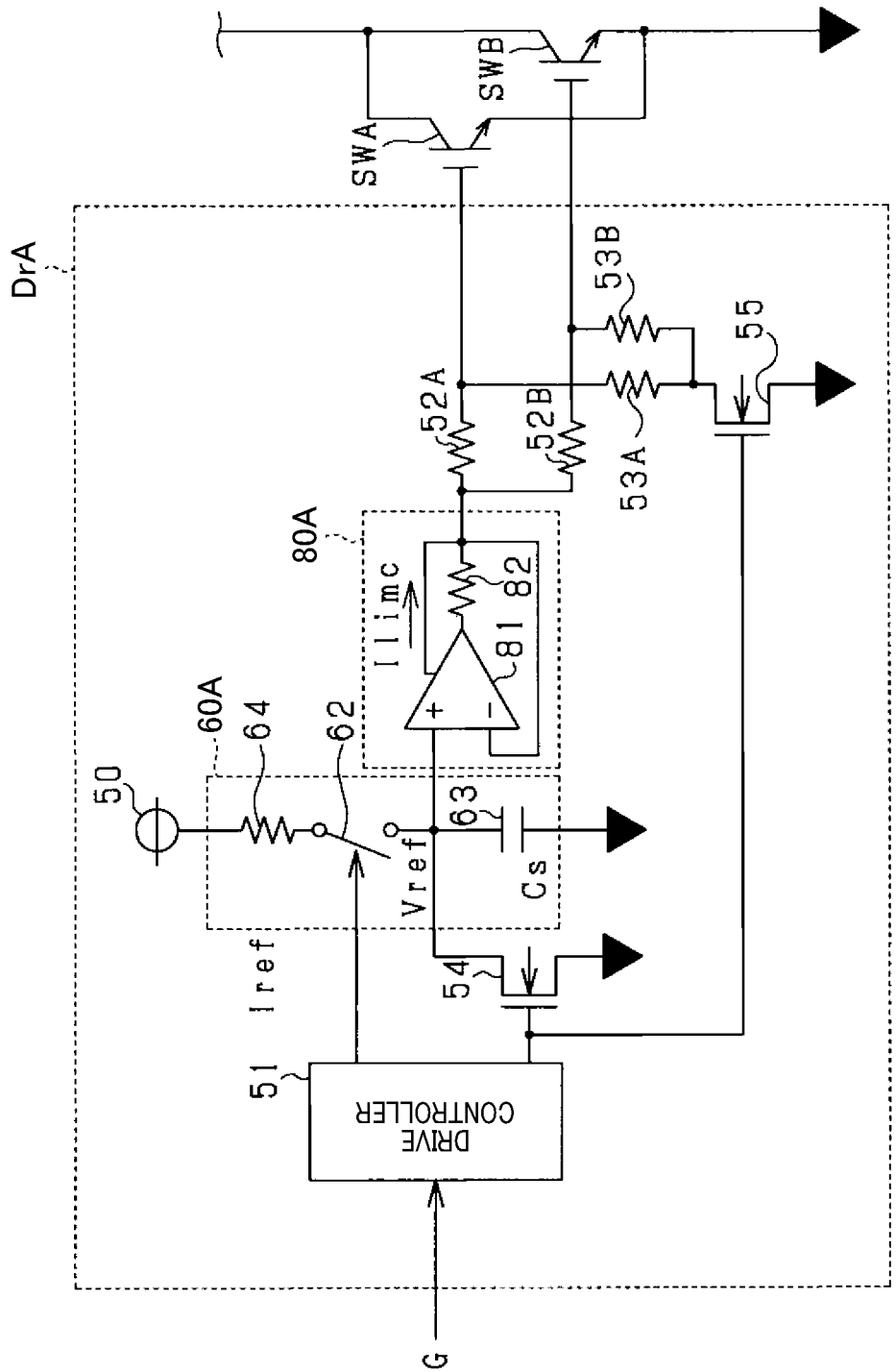
FIG. 5 is a circuit diagram schematically illustrating an example of the structure of a drive circuit for each switch unit according to the second embodiment of the present disclosure.

The following describes the second embodiment of the present disclosure with reference to FIG. 5. FIG. 5 schematically illustrates each drive circuit DrA according to the second embodiment. The structures and/or functions of the drive circuit DrA according to the second embodiment are different from those of the drive circuit Dr according to the first embodiment by the following points. So, the following mainly describes the different points, and omits or simplifies descriptions of like parts between the first and second embodiments, to which identical or like reference characters are assigned, thus eliminating redundant description.

The drive circuit DrA includes a reference voltage generator 60A that includes a resistor, which serves as a voltage generation resistor, 64 for generating a voltage in place of the constant current source 61. The resistor 64 has opposing first and second ends, and a predetermined resistance Rs, and the first end of the resistor 64 is connected to the constant voltage source 50, and the second end of the resistor 64 is connected to the first electrode of the capacitor 63 via the charge switch 62.

That is, the reference voltage generator 60A is configured to gradually increase the reference voltage Vref by a predetermined time constant TC from the 0 volts to the constant voltage VH output from the constant voltage source 50; the time constant is expressed by the following equation TC=Rs×Cs.

This configuration of the drive circuit DrA according to the second embodiment obtains the same technical effects as those obtained by the drive circuit Dr according to the first embodiment.

Third Embodiment

Figure 6:
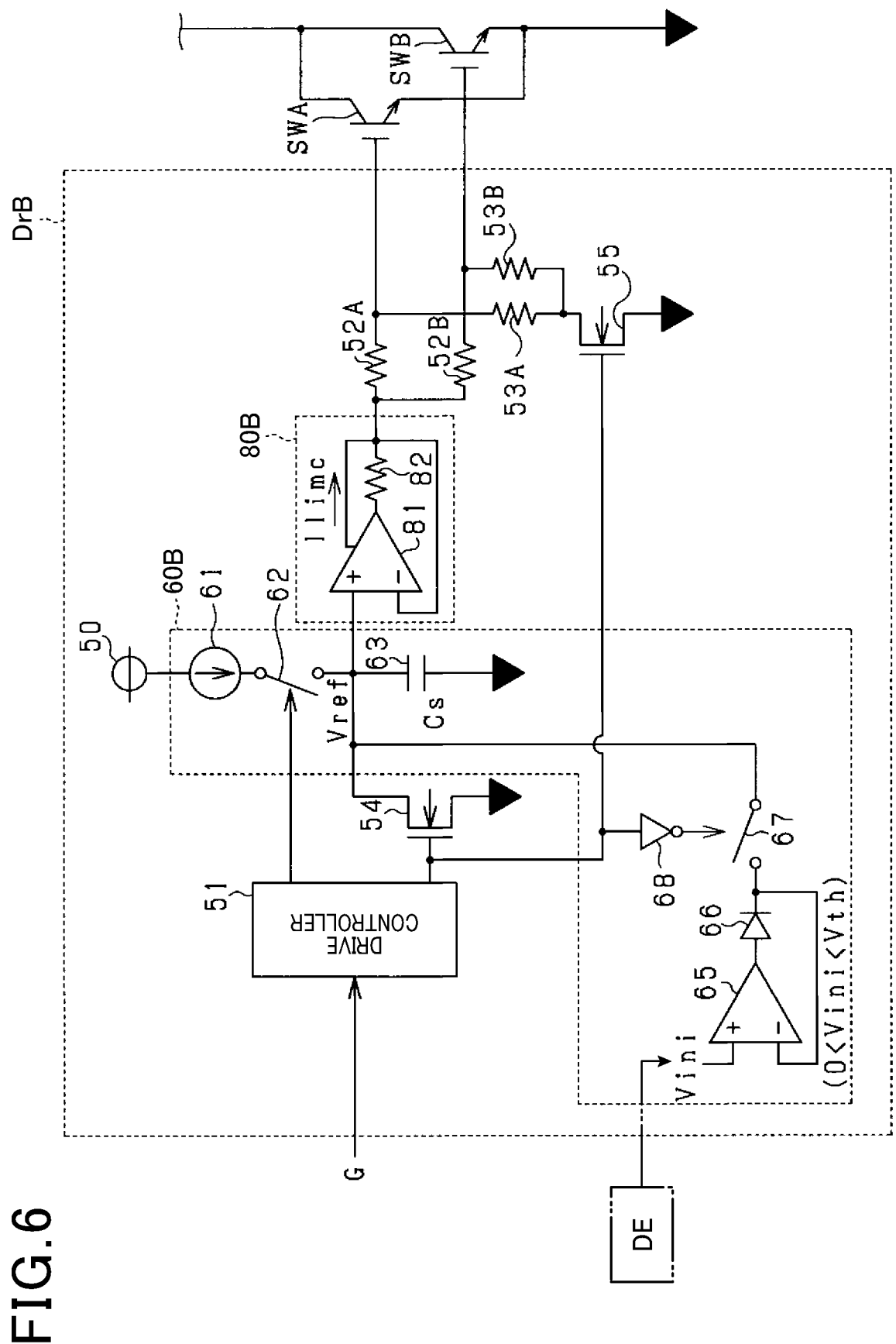
FIG. 6 is a circuit diagram schematically illustrating an example of the structure of a drive circuit for each switch unit according to the third second embodiment of the present disclosure.

The following describes the third embodiment of the present disclosure with reference to FIG. 6. FIG. 6 schematically illustrates each drive circuit DrB according to the third embodiment. The structures and/or functions of the drive circuit DrB according to the third embodiment are different from those of the drive circuit Dr according to the first embodiment by the following points. So, the following mainly describes the different points, and omits or simplifies descriptions of like parts between the first and third embodiments, to which identical or like reference characters are assigned, thus eliminating redundant description.

The drive circuit DrB includes a reference voltage generator 60B.

The reference voltage generator 60B includes an operational amplifier 65, a diode 66, a selection switch 67, and a NOT gate 68. The operational amplifier 65 has a non-inverting input terminal, an inverting input terminal, and an output terminal. An external or internal power supplying device DE (see the external power supplying device DE illustrated as an example in FIG. 6) is configure to supply an initial voltage Vini to the non-inverting input terminal of the operational amplifier 65. The output terminal of the operational amplifier 65 is connected to the anode of the diode 66, and the cathode of the diode 66 is connected to the first electrode of the capacitor 63 via the selection switch 67. The cathode of the diode 66 is also connected to the inverting input terminal of the operational amplifier 65. The selection switch 67 has a control terminal connected to the drive controller 51 commonly with the gate of each of the first and second discharge switches 54 and 55.

The operational amplifier 65 has a voltage buffering function of buffering the initial voltage Vini input thereto, and the diode 66 has a function of restricting the output, i.e. the initial voltage Vini, of the operational amplifier 65 to a current equivalent to the output of the operational amplifier 65. The initial voltage Vini is set to be higher than 0 volts and lower than the threshold voltage Vth of each of the first and second switches SWA and SWB.

The drive controller 51 turns on or off the selection switch 67 via the NOT gate 68. That is, the drive controller 51 applies a logical high-level signal (H) to the gate of each of the first or second discharge switch 54 or 55 to thereby turn on the corresponding switch, thus applying a logical low-level signal (L) to the selection switch 67, thus turning off the selection switch 67. In contrast, the drive controller 51 applies the logical low-level signal to the gate of each of the first or second discharge switch 54 or 55 to thereby turn off the corresponding switch, thus applying the logical high-level signal to the selection switch 67, thus turning on the selection switch 67.

Figure 7A:
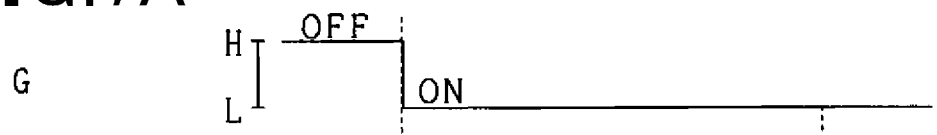
FIGS. 7A to 7C are a joint timing chart schematically illustrating how a reference voltage generator and a voltage buffer illustrated in FIG. 6 work.
Figure 7B:
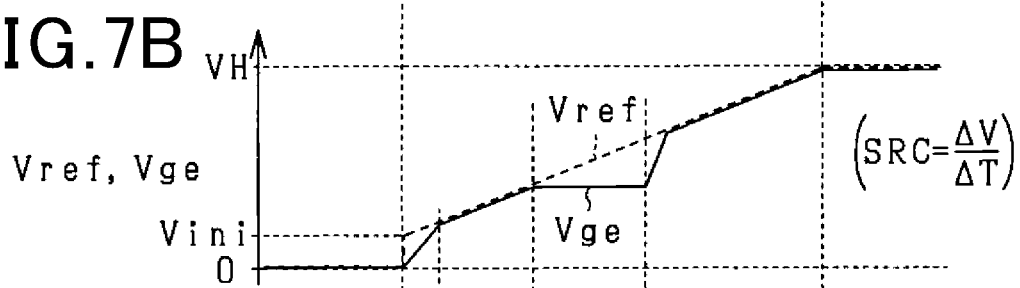
Figure 7C:
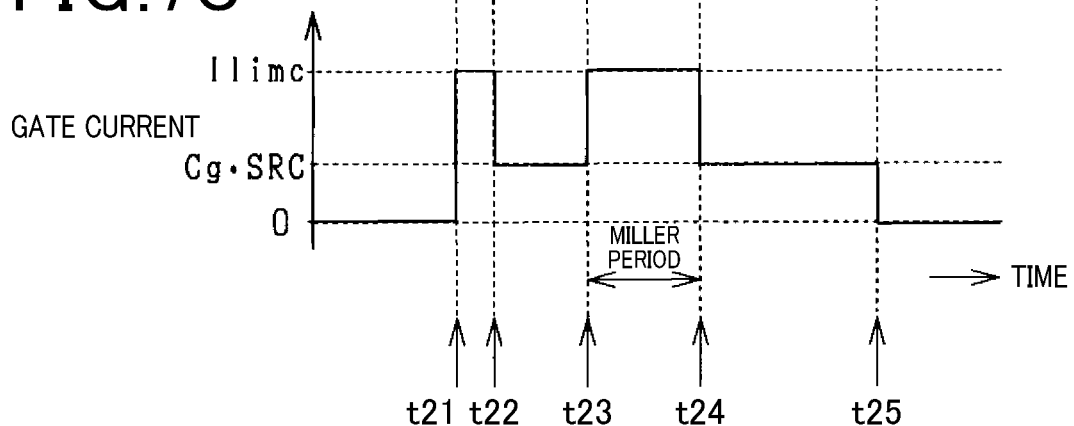

The following describes how the reference voltage generator 60B and the voltage buffer 80 work with reference to FIGS. 7A to 7C. Note that FIGS. 7A to 7C respectively correspond to FIGS. 4A to 4C.

Before time t21, the drive signal G being in the off command maintains each of the first and second discharge switches 54 and 55 in the on state, thus maintaining the charge switch 62 and the selection switch 67 in the off state. This dissipates charge stored in the capacitor 63, resulting in the reference voltage Vref being 0 volts.

Switching the drive signal G from the off command to the on command at the time t21 turns on the charge switch 62 and the selection switch 67, and turns off the first and second discharge switches 54 and 55. This causes the capacitor 63 to be rapidly charged based on the output current supplied from the operational amplifier 65 via the diode 66, so that the reference voltage Vref increases rapidly up to the initial voltage Vini at time t22.

Thereafter, the constant current source 61 causes the reference voltage Vref to continuously increase from the initial voltage Vini at the charging slew rate SRC from the time t22.

This rapid increase of the reference voltage Vref up to the initial voltage Vini causes the reference voltage Vref to increase relative to the gate voltage Vge by the initial voltage Vini. This results in the charging current supplied to the gate of each of the first and second switches SWA and SWB being higher than the charging current of the first embodiment until the gate voltage Vge reaches the reference voltage Vref at the time t22. During the period from the time t21 to the time t22, the charging current is limited to the charge limit ILimc.

After the gate voltage Vge exceeds the initial voltage Vini, a sink current based on the gate voltage Vge toward the operational amplifier 65 is restricted by the diode 66, so that the operational amplifier 65 is configured to be equivalently separated from the first electrode of the capacitor 63. This results in the reference voltage Vref increasing at the charging slew rate SRC defined by the output current Iref of the constant current source 61 and the capacitance Cs of the capacitor 63.

How the reference voltage generator 60B and the voltage buffer 80 work after the time t23 is substantially identical to how the reference voltage generator 60 and the voltage buffer 80 work after the time t12 illustrated in FIGS. 4A to 4C, so that description of how the reference voltage generator 60B and the voltage buffer 80 work after the time t23 is omitted.

As described above, the drive circuit DrB according to the third embodiment enables the pre-Miller period, which less contributes to the increase rate of the collector current and decrease rate of the collector voltage Vce, before the Miller period to be shorter to thereby make faster the turn-on rate of each of the first and second switches SWA and SWB. This therefore reduces switching loss of each of the first and second switches SWA and SWB while obtaining the same benefits as those obtained by the first embodiment.

Fourth Embodiment

Figure 8:
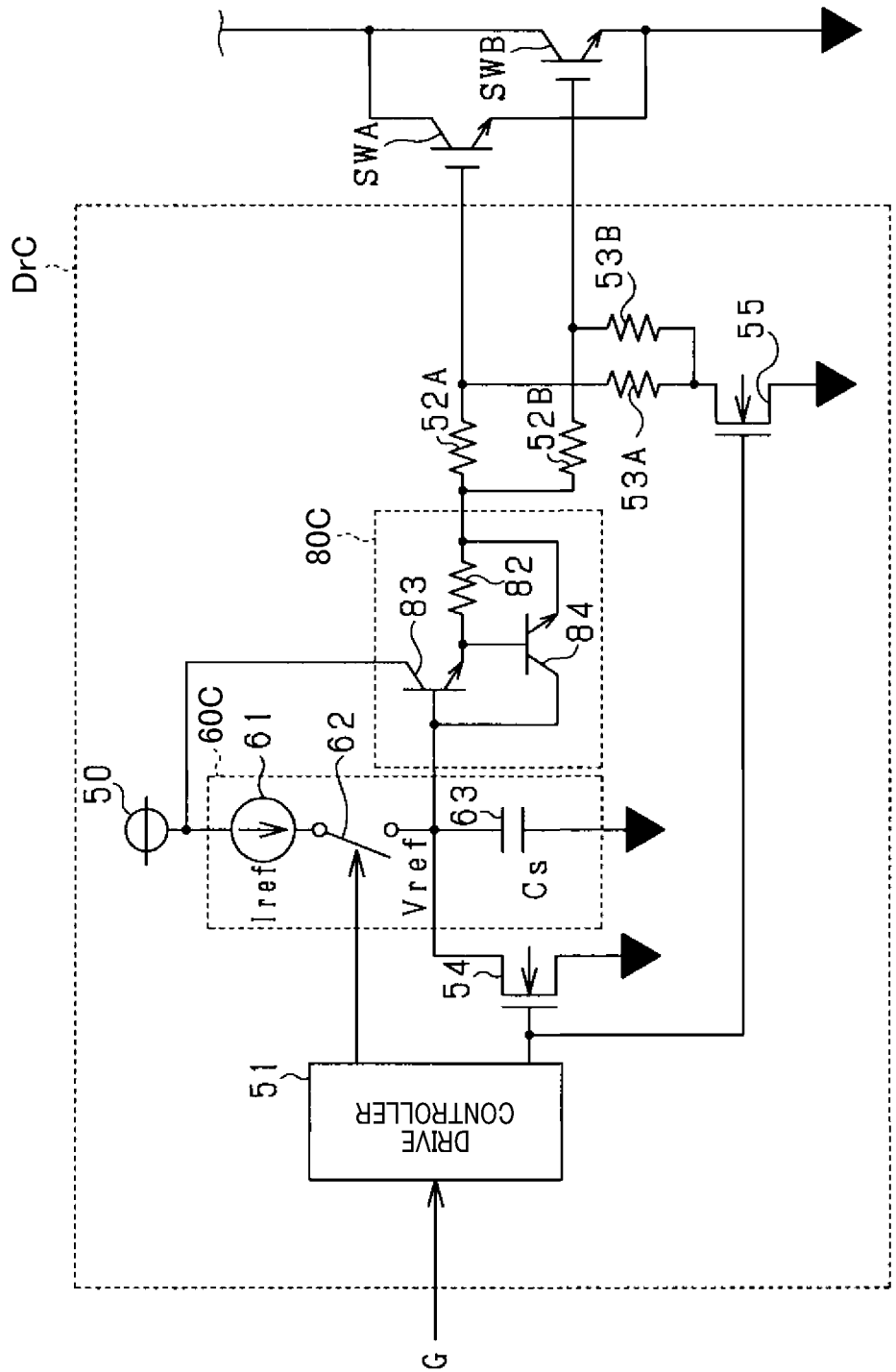
FIG. 8 is a circuit diagram schematically illustrating an example of the structure of a drive circuit for each switch unit according to the fourth embodiment of the present disclosure.

The following describes the fourth embodiment of the present disclosure with reference to FIG. 8. FIG. 8 schematically illustrates each drive circuit DrC according to the fourth embodiment. The structures and/or functions of the drive circuit DrC according to the fourth embodiment are different from those of the drive circuit Dr according to the first embodiment by the following points. So, the following mainly describes the different points, and omits or simplifies descriptions of like parts between the first and fourth embodiments, to which identical or like reference characters are assigned, thus eliminating redundant description.

The drive circuit DrC includes a voltage buffer 80C.

The voltage buffer 80C includes the charge limit resistor 82, which has a resistance Rlimc and opposing first and second ends, a first charge control switch 83, and a second charge control switch 84. The third embodiment uses an NPN transistor for each of the first and second charge control switches 83 and 84.

The base of the first charge control switch 83 is connected to the first end of the capacitor 63, and the collector of the first charge switch 83 is connected to the constant voltage source 50. The emitter of the first charge control switch 83 is connected to both the first end of the charge limit resistor 82, and the base of the second charge limit switch 84. The collector of the second charge control switch 84 is connected to first end of the capacitor 63, and the emitter of the second charge control switch 84 is connected to the second end of the charge limit resistor 82.

The second end of the charge limit resistor 82 is also connected to the first end of each of the first and second charge resistors 52A and 52B.

The following describes how the reference voltage generator 60 and the voltage buffer 80C.

Switching the drive signal G from the off command to the on command turns on the charge switch 62, and turns off the first and second discharge switches 54 and 55. This turns on the first charge control switch 83, so that the reference voltage Vref starts to increase from 0 volts at the charging slew rate SRC. This turn-on of the first charge control switch 83 causes a charging current based on the output constant voltage VH of the constant voltage source 50 to be supplied to the gate of each of the first and second switches SWA and SWB via the corresponding one of the first and second charge resistors 52A and 52B.

When the gate voltage Vge has reached the Miller voltage, that is, when the Miller period is started, the gate voltage Vge becomes equal to the collector voltage Vce of each of the first and second switches SWA and SWB, so that the gate-collector capacitance, i.e. the feedback capacitance, of each of the first and second switches SWA and SWB increases. Therefore, because it is necessary to charge the feedback capacitance of each of the first and second switches SWA and SWB, the charge stored in the gate of each of the first and second switches SWA and SWB flows into the feedback capacitance, causing the gate voltage Vge not to increase. In contrast, the reference voltage Vref continuously increases. This difference between the reference voltage Vref and the gate voltage Vge results in the charging current flowing through the first charge control switch 83 based on the constant voltage source 50, so that a voltage drop across the charge limit resistor 82 becomes higher than a base-emitter voltage ΔVc of the second charge control switch 84. This causes the second charge control switch 84 to be turned on, so that the charging current for charging the gate of each of the first and second switches SWA and SWB is limited to a charge limit ILimc1 that is expressed by ΔVc/Rlimc.

Note that the reference voltage Vref according to the fourth embodiment is maintained at a constant value during the second charge control switch 84 being in the on state. This is because turn-on of the second charge control switch 84 causes a constant current to be supplied from the constant current source 61 to the gate of each of the first and second switches SWA and SWB.

Termination of the Miller period results in the charging current decreasing to thereby turn off the second charge control switch 84, resulting in the reference voltage Vref starts to increase again at the charging slew rate SRC.

This configuration of the drive circuit DrC according to the fourth embodiment obtains the same technical effects as those obtained by the drive circuit Dr according to the first embodiment.

Fifth Embodiment

Figure 9:
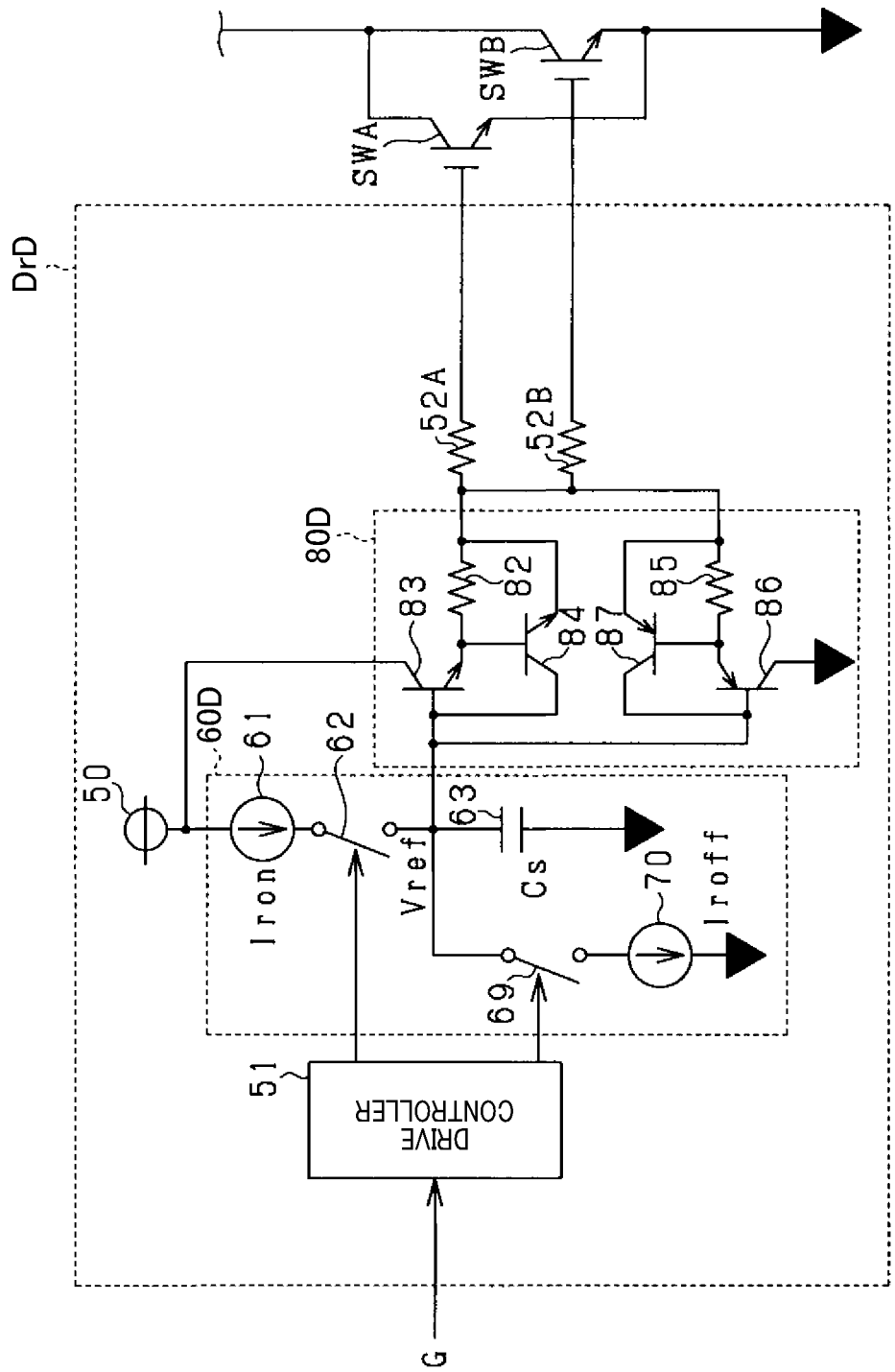
FIG. 9 is a circuit diagram schematically illustrating an example of the structure of a drive circuit for each switch unit according to the fifth embodiment of the present disclosure.

The following describes the fifth embodiment of the present disclosure with reference to FIGS. 9 and 10. FIG. 9 schematically illustrates each drive circuit DrD according to the fifth embodiment. The structures and/or functions of the drive circuit DrD according to the fifth embodiment are different from those of the drive circuit Dr according to the first embodiment and the fourth embodiment by the following points. So, the following mainly describes the different points, and omits or simplifies descriptions of like parts between the first, fourth, and fifth embodiments, to which identical or like reference characters are assigned, thus eliminating redundant description.

The drive circuit DrD includes a reference voltage generator 60D and a voltage buffer 80D, which aim to reduce the period of the imbalance phenomenon generated when the first and second switches SWA and SWB are turned off.

The reference voltage generator 60D includes a discharge switch 69 and a second constant current source 70 in addition to the constant current source 61, charge switch 62, and capacitor 63. The constant current source 61 will be referred to as a first constant current source 61 according to the fifth embodiment, and the constant output current of the first constant current source 61 will be referred to as an output current Iron.

The discharge switch 69 has opposing first and second ends. The first end of the discharge switch 69 is connected to the first electrode of the capacitor 63, and the second end of the discharge switch 89 is connected to the common signal ground via the second constant current source 70.

The discharge switch 69 has a control terminal connected to the drive controller 51, so that the drive controller 51 controls on-off switching operations of the discharge switch 69. A constant output current of the second constant current source 69 will be referred to as an output current Iroff in FIG. 9.

The drive controller 51 of the fifth embodiment is configured to perform a charging task to thereby turn on the charge switch 62 while turning off the discharge switch 69. The drive controller 51 of the fifth embodiment is also configured to perform a discharging task to thereby turn off the charge switch 62 while turning on the discharge switch 69.

The discharging task causes the reference voltage Vref to decrease from the constant output voltage VH of the constant voltage source 50 at a constant rate. The decrease rate of the reference voltage Vref will be referred to as a discharging slew rate SRD. That is, the discharging slew rate SRD is defined as a function of the constant output current Iroff and the capacitance Cs of the capacitor 63.

The voltage buffer 80D includes the charge limit resistor 82, the first charge control switch 83, the second charge control switch 84, a discharge limit resistor 85 having a resistance Rlimd and opposing first and second ends, a first discharge switch 86, and a second discharge switch 87. The fifth embodiment uses a PNP transistor for each of the first and second discharge control switches 86 and 87.

The first end of the discharge limit resistor 85 is connected to the first end of each of the first and second charge resistors 52A and 52B, and also connected to the emitter of the second discharge control switch 87. The second end of the discharge limit resistor 85 is connected to the base of the second discharge control switch 87, and also connected to the emitter of the first discharge control switch 86. The collector of the first discharge control switch 86 is connected to the common signal ground, and the base of the first discharge control switch 86 is connected to the collector of the second discharge control switch 87, and also connected to the first electrode of the capacitor 63.

Figure 10A:
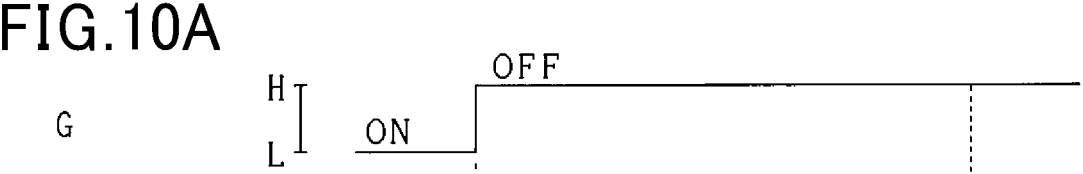
FIGS. 10A to 10C are a joint timing chart schematically illustrating how a reference voltage generator and a voltage buffer illustrated in FIG. 9 work.
Figure 10B:
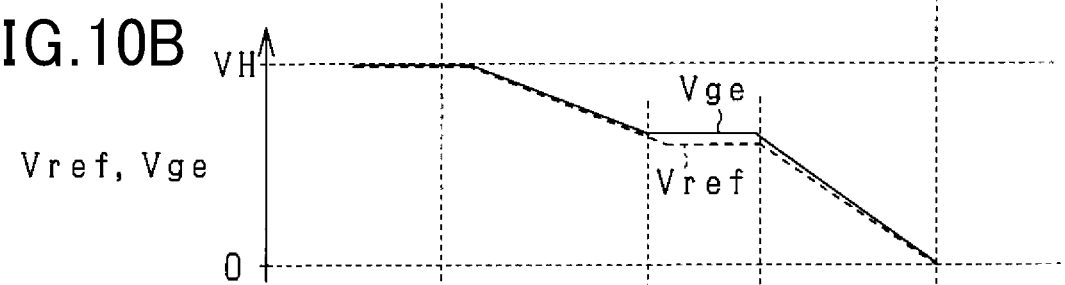
Figure 10C:
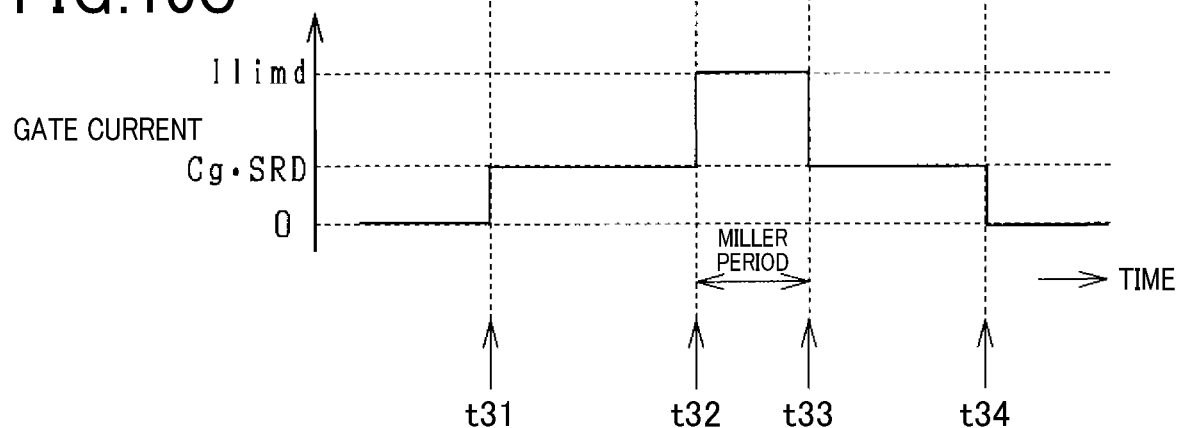

The following describes how the reference voltage generator 60D and the voltage buffer 80D work with reference to FIGS. 10A to 10C.

FIGS. 10A and 10B respectively correspond to FIGS. 4A and 4B. FIG. 10C schematically illustrates how a discharging current discharged from each of the first and second switches SWA and SWB.

Switching the drive signal G from the on command to the off command at time t31 turns off the charge switch 62, and turns on the discharge switch 69. This causes the reference voltage Vref to start to decrease from the constant output voltage VH at the discharging slew rate SRD. The drive signal G switched to the off command also turns on the first discharge control switch 86, so that the discharging current is discharged to flow from the gate of each of the first and second switches SWA and SWB to the common signal ground via the corresponding one of the first and second discharge resistors 52A and 52B, the discharge control resistor 85, and the first discharge control switch 86.

During the period from the time t31 until time t32 at which the gate voltage Vge of each of the first and second switches SWA and SWB has decreased to reach the Miller voltage, the discharging current dissipated from the gate of each of the first and second switches SWA and SWB is expressed by "Cg×SRD".

When the gate voltage Vge has reached the Miller voltage at the time t32, the Miller period is started to continue from the time t32 to time t33. During the Miller period, the gate voltage Vge becomes equal to the collector voltage Vce of each of the first and second switches SWA and SWB, so that the gate-collector capacitance, i.e. the feedback capacitance, of each of the first and second switches SWA and SWB decreases. This increases the discharging current flowing through the first discharge control switch 86. An increase in the discharging current flowing through the first discharge control switch 86 causes a voltage drop across the discharge limit resistor 85 to have exceeded the base-emitter voltage, which will be referred to as ΔVd, of the second discharge control switch 87. This turns on the second discharge control switch 87, so that the discharging current for discharging the gate of each of the first and second switches SWA and SWB is limited to a discharge limit ILimd that is expressed by ΔVd/Rlimd.

On the other hand, the second discharge control switch 87 switched to the on state enables the discharging current to charge the capacitor 63, thus preventing the reference voltage Vref from decreasing. This therefore prevents the difference between the gate voltage Vge and the reference voltage Vref from excessively increasing.

After the termination of the Miller period at the time t33, the gate voltage Vge follows the reference voltage Vref, which continuously decreases at the discharging slew rate SRD, again. Thereafter, the gate voltage Vge reaches 0 volts. Note that the discharging current after the time t33 is expressed by "Cg×SRD".

The drive circuit DrD according to the fifth embodiment set forth above obtains the following technical benefits.

The reference voltage generator 60D is configured to generate the reference voltage Vref that gradually decreases at the discharging slew rate SRD during the period, which will be referred to as a post-Miller period, until which the gate voltage Vge decreases from the Miller voltage to the 0 volts while passing through the threshold voltage Vth.

The voltage buffer 80D limits, during the Miller period, the discharging current for the gate of each of the first and second switches SW1 and SW2 to the discharge limit ILimd while supplying the generated reference voltage Vref to the gate of each of the first and second switches SW1 and SW2; the discharge limit ILimd is set to be higher than the discharging current during the post-Miller period.

Usually, shortening the period of the imbalance phenomenon generated when the first and second switches SWA and SWB are turned off requires an increase of a discharging current to be dissipated from the gate of each switch SWA, SWB, and a reduction in the Miller period. As to the requirement, an increase in the discharging current during the Miller period would increase the increase rate of the collector current flowing through each of the first and second switches SWA and SWB when the switches SWA and SWB are switched to the off state. Additionally, an excessive increase in the discharging current during the post-Miller period would cause the collector current to rapidly decrease, resulting in an increase in a surge voltage.

From the above viewpoints, the reference voltage generator 60D is configured to generate the reference voltage Vref that gradually decreases at the discharging slew rate SRD during the post-Miller period until which the gate voltage Vge decreases from the Miller voltage to the 0 volts while passing through the threshold voltage Vth.

Then, the voltage buffer 80D supplies the reference voltage Vref generated by the reference voltage generator 60D to the gate of each of the first and second switches SWA and SWB.

Adjusting the decrease rate of the reference voltage Vref using the discharging slew rate SRD enables the decrease rate of the collector current during the switches SWA and SWB being switched from the on state to the off state to be set to a value suitable for reducing a surge voltage.

Additionally, the voltage buffer 80D discharges the gate of each of the first and second switches SWA and SWB using the discharging current during the Miller period while adjusting the discharging current being lower than the discharge limit ILimd that is higher than the discharging current during the post-Miller period. This configuration results in the discharging current during the Miller period being higher than the discharging current during the post-Miller period while maintaining the discharging current to be equal to or lower than the discharge limit ILimd during the Miller period, making it possible to shorten the Miller period. The voltage buffer 80D is also configured to set the discharge limit ILimd to a value suitable for limiting an increase in the increase rate of the collector voltage Vce of each off the first and second switches SWA and SWB.

Consequently, the drive circuit DrD of the fifth embodiment reduces the Miller period while limiting an increase in each of (1) The decrease rate of the collector current flowing through each of the first and second switches SWA and SWB during the period of the corresponding one of the switches SWA and SWB being switched from the on state to the off state (2) The increase rate of the collector voltage Vce of each of the first and second switches SWA and SWB during the period of the corresponding one of the first and second switches SWA and SWB being switched from the on state to the off state This therefore results in a shorter length of the Miller period, therefore resulting in a shorter length of the period of the imbalance phenomenon.

Additionally, the drive circuit DrD of the fifth embodiment is configured to prevent the difference between the gate voltage Vge and the reference voltage Vref from excessively increasing during the Miller period. Suppressing a surge voltage during the post-Miller period requires rapid decrease in the discharging current during the post-Miller period. From this viewpoint, this configuration enables the discharging current to rapidly fall down, thus suppressing a surge voltage.

Modifications of the Fifth Embodiment

The reference voltage generator 60 can be configured to stepwisely decrease the reference voltage Vref down to 0 volts after the gate voltage Vge has reached a predetermined voltage that is lower than the threshold voltage Vth and higher than 0 volts. This configuration makes faster the switching rate, i.e. the turn-off rate, of each of the first and second switches SWA and SWB, thus reducing switching loss of each of the first and second switches SWA and SWB.

The voltage buffer 80D can be configured to adjust the discharging current during a part of the Miller period to be larger than the discharging current used during the post-Miller period.

Sixth Embodiment

Figure 11:
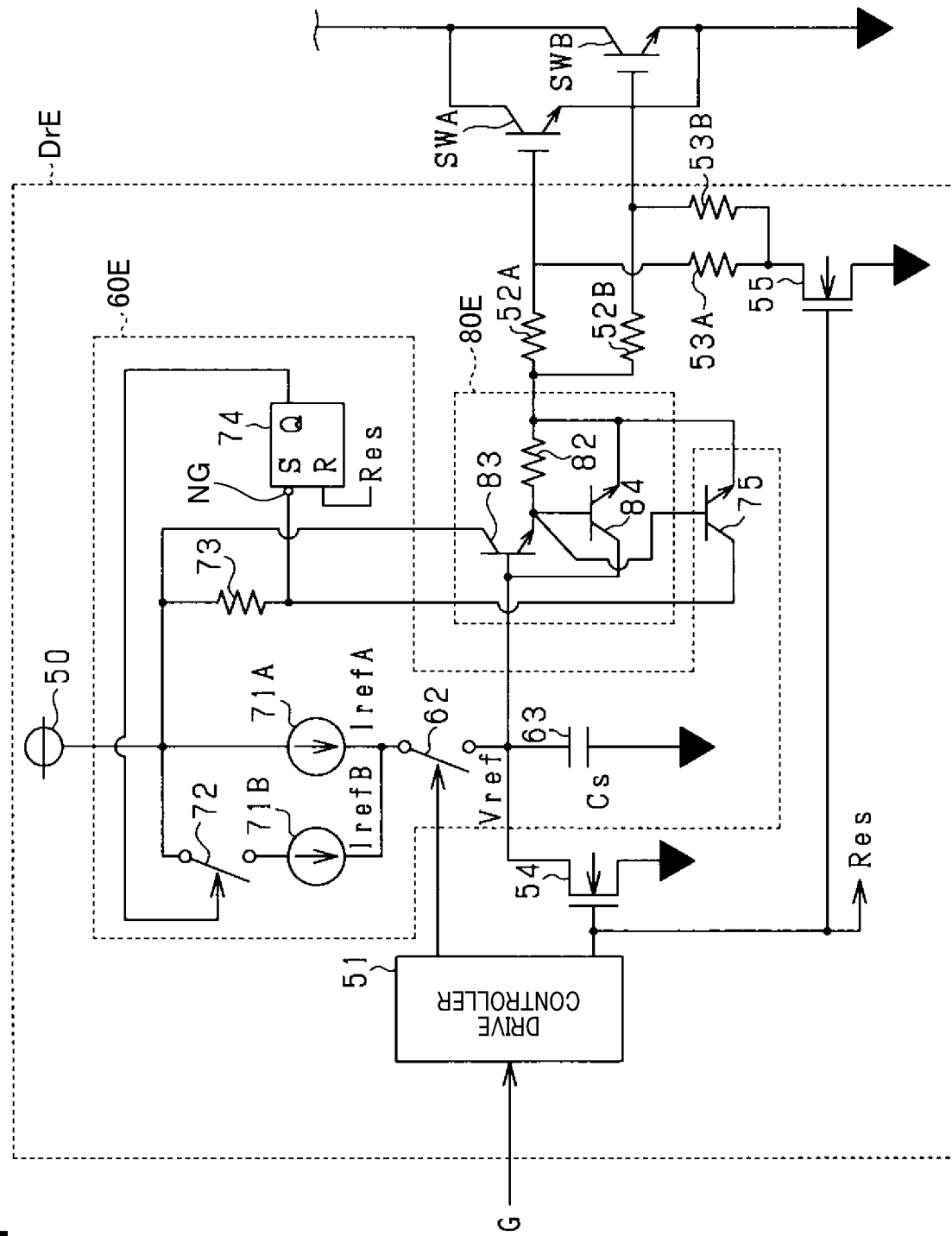
FIG. 11 is a circuit diagram schematically illustrating an example of the structure of a drive circuit for each switch unit according to the sixth embodiment of the present disclosure.

The following describes the fourth embodiment of the present disclosure with reference to FIG. 11. FIG. 11 schematically illustrates each drive circuit DrE according to the sixth embodiment. The structures and/or functions of the drive circuit DrE according to the sixth embodiment are different from those of the drive circuit DrC according to the fourth embodiment by the following points. So, the following mainly describes the different points, and omits or simplifies descriptions of like parts between the fourth and sixth embodiments, to which identical or like reference characters are assigned, thus eliminating redundant description.

The drive circuit DrE includes a reference voltage generator 60E for adjusting the increase rate of the reference voltage Vref after the Miller period to be higher than the increase rate of the reference voltage Vref during the pre-Miller period.

The reference voltage generator 60E includes a first constant current source 71A, a second constant current source 71B, a first control switch 72, a resistor 73, a flipflop circuit 74, and a second control switch 75. The resistance 73 has opposing first and second ends, and the sixth embodiments uses an NPN transistor as the second control switch 75. Each of the charge switch 62 and the first control switch 72 has opposing first and second ends.

Each of the first and second constant current sources 71A and 71B has an input terminal and an output terminal. The constant voltage source 50 is connected to the input terminal of the first constant current source 71A, and the output terminal of the first constant current source 71A is connected to the first end of the charge switch 62. The constant voltage source 50 is also connected to the first end of the first control switch 72, and the second end of the first control switch 72 is connected to the input terminal of the first constant current source 71A. The output terminal of the first constant current source 71A is connected to the first end of the charge switch 62. Each of the first and second constant current sources 71A and 71B is configured to output a corresponding one of an output current Iref1 and an output current Iref2 as illustrated in FIG. 11.

The first end of the resistor 73 is connected to the constant voltage source 50, and the second end of the resistor 73 is connected to the collector of the second control switch 75. The emitter of the second control switch 75 is connected to the second end of the charge limit resistor 82. The base of the second control switch 75 is connected to the first end of the charge limit resistor 82.

The flipflop 74 has a reset terminal (R), a set terminal (S), and an output terminal (Q). The second end of the resistor 73 is connected to the set terminal S of the flipflop 74 via a not gate NG. A gate signal Res, which has one of the logical high and low levels and is output from the drive controller 51 to each of the first and second discharge switches 54 and 55, is input to the reset terminal R of the flipflop 74. The first control switch 72 is in the on state while the output signal of the flipflop 357 has the logical high level (H), and is in the off state while the output signal of the flipflop 357 has the logical low level (L).

Next, the following describes how the reference voltage generator 60E and the voltage buffer 80C work with reference to FIGS. 12A to 12D.

FIGS. 12A to 12C respectively correspond to FIGS. 4A to 4C. FIG. 12D schematically illustrates how the first control switch 72 is driven over time.

Note that, while the second control switch 75 is in the off state, a logical high-level signal (H) is input to the S terminal of the flipflop 74, so that the logical low-level signal (L) is output from the output terminal Q of the flipflop 74 to the first control switch 72.

Switching the drive signal G from the off command to the on command turns on the charge switch 62, and turns off the first and second discharge switches 54 and 55 based on the logical low level of the gate signal Res at time t41. This causes the reference voltage Vref to start to increase from 0 volts at a constant first charging slew rate SRA. The first charging slew rate SRA is defined as a function of the output current Iref1 and the capacitance Cs of the capacitor 63. This also causes the first charge control switch 83 to be turned on, and this turn-on of the first charge control switch 83 causes a charging current based on the output constant voltage VH of the constant voltage source 50 to be supplied to the gate of each of the first and second switches SWA and SWB via the first charge control switch 83, the charge limit resistor 82, and the corresponding one of the first and second charge resistors 52A and 52B.

When the gate voltage Vge has reached the Miller voltage at time t42, that is, when the Miller period is started, the gate voltage Vge becomes equal to the collector voltage Vce of each of the first and second switches SWA and SWB, so that the gate-collector capacitance, i.e. the feedback capacitance, of each of the first and second switches SWA and SWB increases. Therefore, it is necessary to charge the feedback capacitance of each of the first and second switches SWA and SWB. This increases the charging current flowing through the first charge control switch 83 based on the constant voltage source 50, so that the voltage drop across the charge limit resistor 82 becomes higher than the base-emitter voltage ΔVc of the second charge control switch 84. This causes the second charge control switch 84 to be turned on, so that the charging current for charging the gate of each of the first and second switches SWA and SWB is limited to the charge limit ILimc 1 that is expressed by ΔVc/Rlimc.

In addition, the second control switch 75 switched from the off state to the on state causes the logical level of the output signal to the set terminal S of the flipflop 74 to change from the logical high level to the logical low level. This causes the logical level of the output signal from the output terminal Q of the flipflop 74 to change from the logical low level to the logical high level, thus turning on the first control switch 72. Because the second charge control switch 84 is in the on state, the charging current for the gate of each of the first and second switches SWA and SWB is substantially limited to the charge limit ILimc1 that is expressed by ΔVc/Rlimc. During the second charge control switch 72 being in the on state, the reference voltage Vref is maintained at a constant value without increasing.

Termination of the Miller period at the time t43 causes the second charge switch 84 and the second control switch 75 to be turned off while the logical level of the output signal from the output terminal Q of the flipflop 74 is maintained at the logical high level. This causes the reference voltage Vref to start to increase at a second charging slew rate SRB higher than the first charging slew rate SRA; the second charging slew rate SRB is expressed by the following equation "SRB=(Iref1+Iref2)/Cs".

Thereafter, switching the drive signal G from the on command to the off command turns off the charge switch 62, turns on the first and second discharge switches 54 and 55, and changes the logical level of the gate signal Res from the logical low level to the logical high level, thus resetting the flipflop 74. This causes the logical level of the output signal form the output terminal Q of the flipflop 74 to change from the logical high level to the logical low level, turning off the first control switch 72.

As described above, the drive circuit DrE according to the sixth embodiment increases the charging current after the Miller period, which less contributes to the increase rate of the collector current and decrease rate of the collector voltage Vce, to thereby make faster the turn-on rate of each of the first and second switches SWA and SWB. This therefore reduces switching loss of each of the first and second switches SWA and SWB while obtaining the same benefits as those obtained by the fourth embodiment.

Seventh Embodiment

Figure 13:
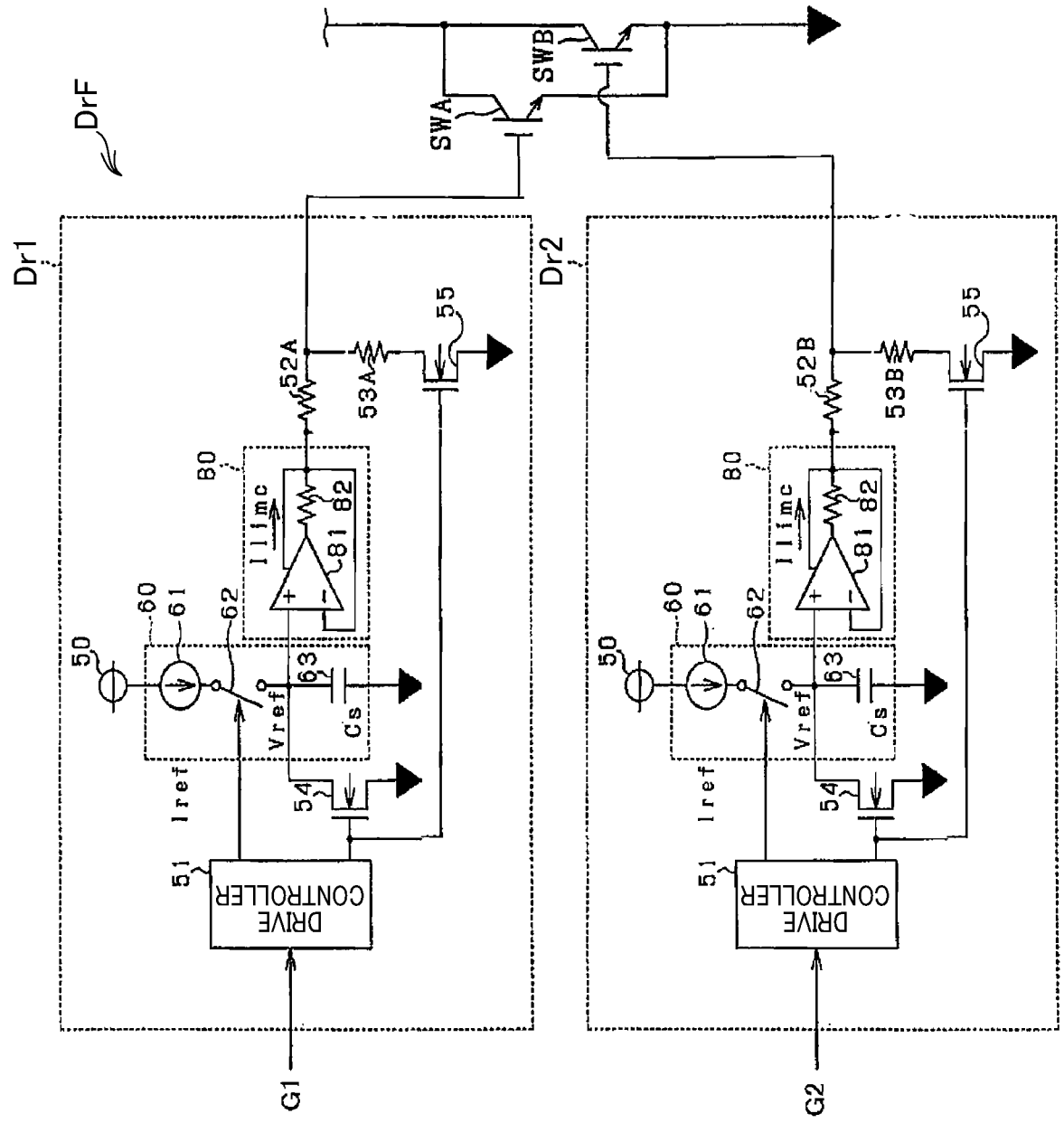
FIG. 13 is a circuit diagram schematically illustrating an example of the structure of a drive circuit for each switch unit according to the seventh embodiment of the present disclosure.

The following describes the seventh embodiment of the present disclosure with reference to FIGS. 13 and 14. The structures and/or functions of a drive circuit DrF according to the seventh embodiment are different from those of the drive circuit Dr according to the first embodiment by the following points. So, the following mainly describes the different points, and omits or simplifies descriptions of like parts between the first and second embodiments, to which identical or like reference characters are assigned, thus eliminating redundant description.

The drive circuit DrF includes a first drive circuit unit Dr1 and a second drive circuit unit Dr2 individually provided for the respective first and second switches SWA and SWB.

That is, the first and second drive circuit units Dr1 and Dr2 control the gate voltages of the respective first and second switches SWA and SWB such that the turn-on timing of the first switch SWA is different from the turn-on timing of the second switch SWB. For example, the second drive circuit unit Dr2 controls the gate voltage of the second switch SWB such that the gate voltage of the second switch SWB is higher than the threshold voltage while the first drive circuit unit Dr1 maintains the gate voltage of the first switch SWA at the Miller voltage.

The second drive circuit unit Dr2 also adjusts the charging current supplied to the gate of the second switch SWB to be lower than the charging current supplied to the gate of the first switch SWA during at least part of the Miller period during which the gate voltage of the first switch SWA being maintained at the Miller period.

Note that the drive signal G input to the first drive circuit unit Dr1 will be referred to as a first drive signal G1, and the drive signal G input to the second drive circuit unit Dr2 will be referred to as a second drive signal G2. The first and second drive signals G1 and G2 are generated by the control device 40.

The following describes how the gate voltages of the respective first and second switches SWA and SWB are controlled with reference to FIGS. 14A to 14F.

Figure 14A:
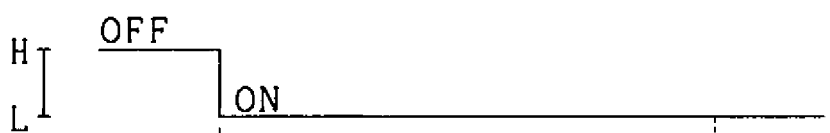
FIGS. 14A to 14F are a joint timing chart schematically illustrating how a reference voltage generator and a voltage buffer illustrated in FIG. 13 work.
Figure 14B:
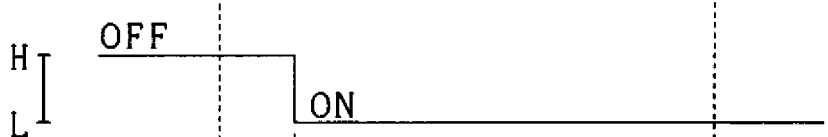
Figure 14C:
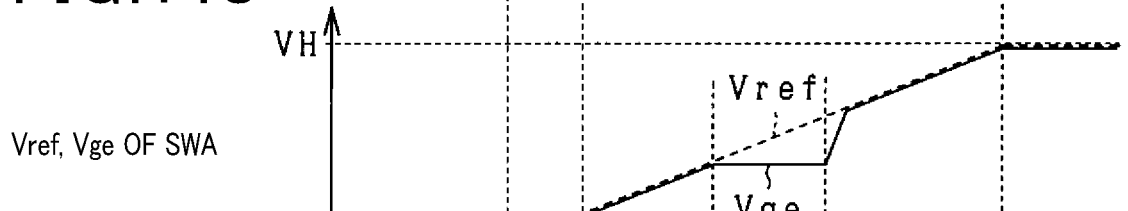
Figure 14D:
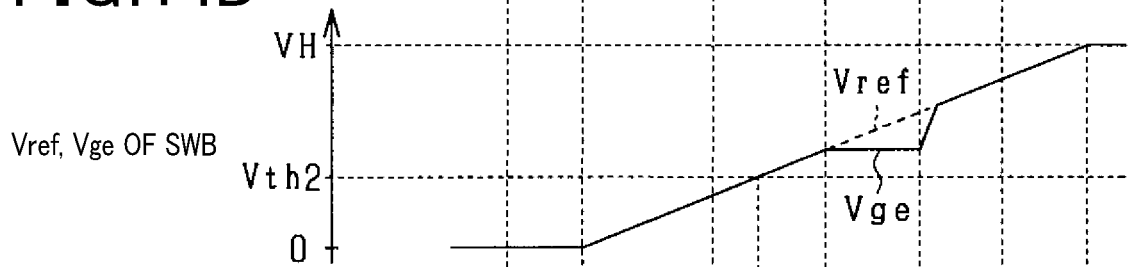
Figure 14E:
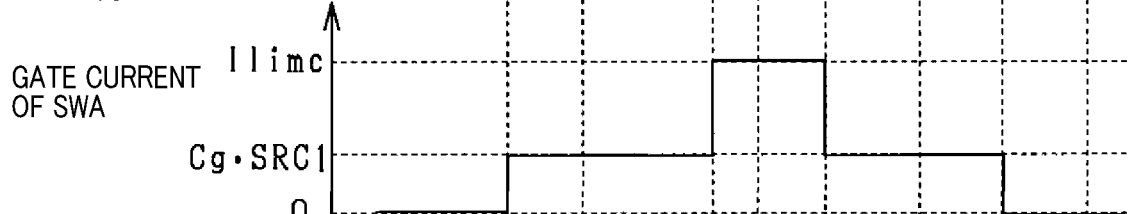
Figure 14F:
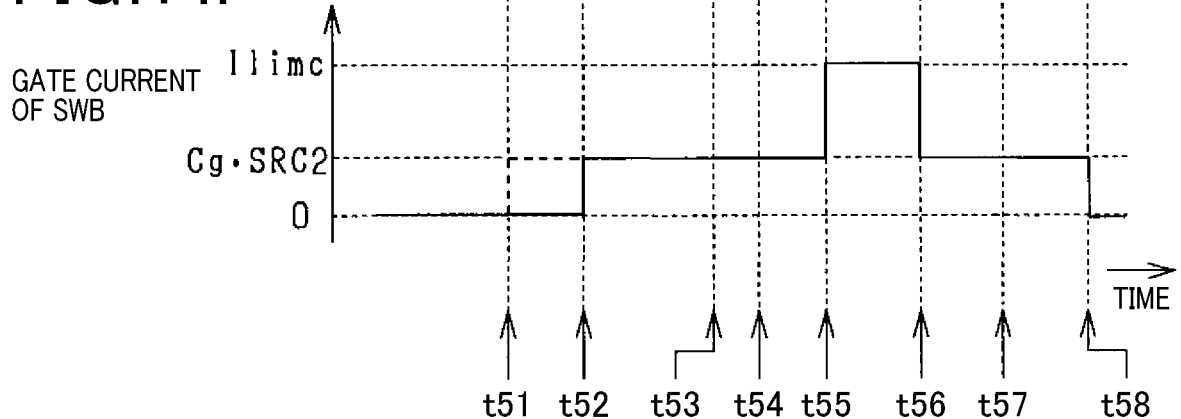

FIGS. 14A and 14B schematically illustrate how the respective first and second drive signals G1 and G2 are changed over time, and FIG. 14C schematically illustrates how the reference voltage Vref and the gate voltage Vge of the first switch SWA generated by the first drive circuit DR1 are changed over time. FIG. 14D schematically illustrates how the reference voltage Vref and the gate voltage Vge of the second switch SWB generated by the second drive circuit DR2 are changed over time. FIG. 14E schematically illustrates how the charging current supplied to the gate of the first switch SWA is changed over time, and FIG. 14F schematically illustrates how the charging current supplied to the gate of the second switch SWB is changed over time.

Switching the first drive signal G1 from the off command to the on command at time t51 turns on the charge switch 62, and turns off the first and second discharge switches 54 and 55 of the first drive circuit unit Dr1. This causes the reference voltage Vref of the first switch SWA to start to increase from 0 volts at a first charging slew rate SRC1 that can be set to be equal to the slew rate SRC according to the first embodiment or different therefrom.

Thereafter, switching the second drive signal G2 from the off command to the on command at time t52 turns on the charge switch 62, and turns off the first and second discharge switches 54 and 55 of the second drive circuit unit Dr2. This causes the reference voltage Vref of the second switch SWB to start to increase from 0 volts at a second charging slew rate SRC2 that can be set to be equal to or different from the first charging slew rate SRC1.

Thereafter, the gate voltage Vge of the first switch SWA increases to pass through a first threshold voltage Vth1 of the first switch SWA, and when the gate voltage Vge of the first switch SWA has reached the Miller voltage at time t53, the Miller period of the first switch SWA is started from the time t53 to time t35.

At time t54 during the Miller period of the first switch SWA, the gate voltage Vge of the second switch SWB has exceeded a second threshold voltage Vth2 of the second switch SWB, and thereafter, has reached the Miller voltage at the time t55 when the Miller period of the first switch SWA is terminated. The Miller period of the second switch SWB is started from the time t55 to time t56.

FIGS. 14E and 14F show that, during the Miller period of the first switch SWA from the time t33 to the time t35, the first and second drive circuit units Dr1 and Dr2 adjust the charging current for charging the gate of the second switch SWB is lower than the charging current for charging the gate of the first switch SWA.

Thereafter, the gate voltage Vge of the first switch SWA reaches the upper limit corresponding to the constant voltage VH output from the constant voltage source 50, and thereafter, the gate voltage Vge of the second switch SWB reaches the upper limit corresponding to the constant voltage VH output from the constant voltage source 50.

As described above, the drive circuit DrF is configured to switch the second switch SWB from the off state to the on state during the Miller period of the first switch SWA, thus shifting the turn-on timings of the first and second switches SWA and SWB from each other.

If the gate-charge transfer rate of the first switch SWA, which is set to be higher by the voltage buffer 80 of the first drive circuit unit Dr1, had influence on the second switch SWB, a surge voltage might increase when the second switch SWB is turned on.

From this viewpoint, the configuration of the drive circuit DrF makes shorter the Miller period of the first switch SWA while suppressing an increase of the surge voltage generated when the second switch SWB is turned on.

Modifications of the Seventh Embodiment

The charge current limit ILim for the first switch SWA illustrated in FIG. 14E can be set to be different from the charge current limit ILim for the second switch SWB illustrated in FIG. 14F.

The second drive circuit unit Dr2 can adjust the charging current supplied to the gate of the second switch SWB to be lower than the charging current supplied to the gate of the first switch SWA during at least part or the whole of the Miller period during which the gate voltage of the first switch SWA being maintained at the Miller period.

The drive circuit DrF can be configured to control the gate voltages of the respective first and second switches SWA and SWB to thereby adjust the turn-off timing of the first switch SWA to be later than the turn-off timing of the second switch SWB. For example, the second drive circuit unit Dr2 can control the gate voltage of the second switch SWB such that the gate voltage of the second switch SWB is lower than the threshold voltage Vth2 while the first drive circuit unit Dr1 maintains the gate voltage of the first switch SWA at the Miller voltage. The second drive circuit unit Dr2 can also adjust the discharging current dissipated from the gate of the second switch SWB to be lower than the discharging current dissipated from the gate of the first switch SWA during at least part or whole of the Miller period of the first switch SWA. This makes shorter the Miller period of the first switch SWA while suppressing an increase of the surge voltage generated when the second switch SWB is turned off.

Modifications

The present disclosure is not limited to the above embodiments, and therefore the above embodiments can be freely combined with each other or variably modified within the scope of the present disclosure.

The drive circuit DrE of the sixth embodiment can be configured to change the increase rate of the reference voltage Vref during each of the pre-Miller period from the time t41 to the time t42 and the post-Miller period from the time t43 to the time t44. For example, the drive circuit DrE of the sixth embodiment can be configured to change the increase rate of the reference voltage Vref during each of the pre-Miller period from the time t41 to the time t42 and the post-Miller period from the time t43 to the time t44 while monotonically increasing the increase rate of the reference voltage Vref. In this modification, the maximum value of the increase rate of the reference voltage Vref during the pre-Miller period from the time t41 to the time t42 needs to be lower than the minimum value of the increase rate of the reference voltage Vref during the post-Miller period from the time t43 to the time t44.

The reference voltage generator 60A of the second embodiment can be applied to the other embodiments except for the second embodiment.

Each of the switch units SUU and SLU can be comprised of three or more switches connected in parallel to each other, or can be comprised of a single switch. A single switch constituting each of the switch units SUU and SLU makes shorter the Miller period of the switch, reducing switching loss caused when the switch is turned on or off.

Another type of switch, such as a silicon carbide (SiC) N-channel MOSFET, can be used for each switch constituting the inverter 20. In this modification, the drain of the SiC N-channel MOSFET represents a high-side terminal, and the source thereof represents a low-side terminal.

The present disclosure can be applied to other power converters except for inverters, such as DC-DC converters each having at least one of a voltage step-up function and a voltage step-down function.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A drive circuit for driving a switch having a control terminal, a Miller voltage, and a threshold voltage lower than the Miller voltage, the drive circuit comprising:
   a reference voltage generator comprising a charge switch and a capacitor connected to the charge switch, the reference voltage generator being configured to:
      generate, based on a voltage supplied from a power source, a reference voltage that is a voltage across the capacitor, the reference voltage monotonically increasing in a direction to pass through the threshold voltage during a voltage at the control terminal being lower than the Miller voltage;
   a driver controller programmed to control the charge switch to switch on or off; and
   a buffer unit configured to:
      supply the reference voltage output from the reference voltage generator to the control terminal of the switch; and
      adjust a first transfer rate of electrical charge to or from the control terminal of the switch during at least part of a Miller period to be higher than a second transfer rate of electrical charge to or from the control terminal of the switch during the voltage at the control terminal passing through the threshold voltage, the Miller period being a period during which the voltage at the control terminal of the switch is maintained at the Miller voltage.

2. The drive circuit according to claim 1, wherein:
   the reference voltage generator is configured to:
      generate the reference voltage that increases during at least a first period, and output the reference voltage to the buffer unit, the first period being a period during which the voltage at the control terminal increases from a first time of an on command for the switch being input to the control terminal to a second time of the voltage at the control terminal passing through the threshold voltage; and
   the buffer unit is configured to:
      supply the reference voltage output from the reference voltage generator to the control terminal of the switch; and
      adjust a first charging current supplied to the control terminal of the switch during at least part of the Miller period to be higher than a second charging current supplied to the control terminal of the switch during the voltage at the control terminal passing through the threshold voltage.

3. The drive circuit according to claim 2, wherein:
   the reference voltage generator is configured to:
      generate, based on a power supply voltage higher than the Miller voltage, the reference voltage that increases during at least a second period, and output the reference voltage to the buffer unit, the second period being a period during which the voltage at the control terminal increases from the first time of the on command for the switch being input to the control terminal to the second time of the voltage at the control terminal reaching a predetermined voltage higher than the Miller voltage.

4. The drive circuit according to claim 3, wherein:
   the reference voltage generator is configured to:
      adjust a first increase rate of the reference voltage during the voltage at the control terminal being higher than the Miller voltage to be higher than a second increase rate of the reference voltage during the voltage at the control terminal passing through the threshold voltage.

5. The drive circuit according to claim 2, wherein:
   the buffer unit comprises:
      a first charge control switch comprised of an NPN transistor having a base, a collector, and an emitter, the base being connected to the reference voltage generator, a power supply voltage higher than the Miller voltage being input to the collector;
      a second charge control switch comprised of an NPN transistor having a base, a collector, and an emitter, the collector of the second charge control switch being connected to the reference voltage generator, the base of the second charge control switch being connected to the emitter of the first charge control switch; and
      a charge limit resistor having opposing first and second ends, the first end being connected to the emitter of the first charge control switch, the second end being connected to the control terminal of the switch.

6. The drive circuit according to claim 2, wherein:
   the reference voltage generator is configured to:
      generate the reference voltage that gradually increases from an initial value that is set to be more than zero and lower than the threshold voltage.

7. The drive circuit according to claim 2, wherein:
   the reference voltage generator comprises a constant current source configured to output a constant current based on a voltage that is supplied from a power source and is higher than the Miller voltage;

the charge switch has opposing first and second ends, the
first end of the charge switch being connected to the
constant current source;
the capacitor has opposing first and second electrodes, the
first electrode of the capacitor being connected to the
second end of the charge switch; and
the reference voltage generator is configured to output a
potential at the first electrode of the capacitor as the
reference voltage.

8. The drive circuit according to claim 2, wherein:
the reference voltage generator comprises a voltage generation resistor having opposing first and second ends, the first end of the voltage generation resistor being connected to a power source that outputs a voltage higher than the Miller voltage;
the charge switch has opposing first and second ends, the first end of the charge switch being connected to the second end of the voltage generation resistor;
the capacitor has opposing first and second electrodes, the first electrode of the capacitor being connected to the second end of the charge switch; and
the reference voltage generator is configured to output a potential at the first electrode of the capacitor as the reference voltage.

9. The drive circuit according to claim 1, wherein:
the reference voltage generator is configured to:
generate the reference voltage that decreases during at least a third period, and output the reference voltage to the buffer unit, the third period being a period during which the voltage at the control terminal decreases from the Miller voltage down to pass through the threshold voltage; and
the buffer unit is configured to:
supply the reference voltage output from the reference voltage generator to the control terminal of the switch; and
adjust a first discharging current discharged from the control terminal of the switch during at least part of the Miller period to be higher than a second discharging current discharged from the control terminal of the switch during the voltage at the control terminal passing through the threshold voltage.

10. The drive circuit according to claim 9, wherein:
the buffer unit comprises:
a first discharge control switch comprised of a PNP transistor having a base, a collector, and an emitter, the base being connected to the reference voltage generator, the collector being connected to a signal ground;
a second discharge control switch comprised of a PNP transistor having a base, a collector, and an emitter, the collector of the second discharge control switch being connected to the reference voltage generator, the base of the second discharge control switch being connected to the emitter of the first discharge control switch; and
a discharge limit resistor having opposing first and second ends, the first end being connected to the emitter of the second discharge control switch and to the control terminal of the switch, the second end being connected to the emitter of the first discharge control switch and to the base of the second discharge control switch.

11. The drive circuit according to claim 1, wherein:
the switch comprises at least first and second switches connected to each other in parallel, and
the driver controller is programmed to:
control a first switching timing of the first switch from one of an on state and an off state to the other thereof to be shifted from a second switching timing of the second switch from one of the on state and the off state to the other thereof,
wherein the drive circuit is configured to:
control the voltage at the control terminal of one of the first and second switches to be maintained at the Miller voltage of one of the first and second switches while controlling the voltage at the control terminal of the other of the first and second switches to be maintained during the voltage at the control terminal of the other of the first and second switches passing through the corresponding threshold voltage; and
adjust a transfer rate of electrical charge to or from the control terminal of one of the first and second switches during at least part of the Miller period to be lower than a transfer rate of electrical charge to or from the control terminal of the other of the first and second switches during the voltage at the control terminal of the other of the first and second switches passing through the corresponding threshold voltage.

12. The drive circuit according to claim 1, further comprising:
two discharge switches that are both connected to a ground,
wherein the driver controller is programmed to control the two discharge switches to switch on or off, and cause a discharge current to flow in the drive circuit to the ground when the two discharge switches are turned on.

13. A drive circuit for driving a switch having a control terminal, a Miller voltage, and a threshold voltage lower than the Miller voltage, the drive circuit comprising:
a reference voltage generator comprising a constant current source, a charge switch and a capacitor connected to the charge switch, the reference voltage generator being configured to:
generate, based on a voltage supplied from a power source, a reference voltage that is a voltage across the capacitor, the reference voltage -monotonically increasing in a direction to pass through the threshold voltage during a voltage at the control terminal being lower than the Miller voltage;
a processor programmed to control the charge switch to switch on or off; and
an amplifier circuit configured to:
supply the reference voltage output from the reference voltage generator to the control terminal of the switch; and
adjust a first transfer rate of electrical charge to or from the control terminal of the switch during at least part of a Miller period to be higher than a second transfer rate of electrical charge to or from the control terminal of the switch during the voltage at the control terminal passing through the threshold voltage, the Miller period being a period during which the voltage at the control terminal of the switch is maintained at the Miller voltage.

* * * * *